United States Patent
Tanji et al.

(10) Patent No.: US 10,439,438 B2
(45) Date of Patent: Oct. 8, 2019

(54) NON-CONTACT POWER SUPPLY APPARATUS, PROGRAM, METHOD FOR CONTROLLING NON-CONTACT POWER SUPPLY APPARATUS, AND NON-CONTACT POWER TRANSMISSION SYSTEM

(71) Applicant: Panasonic Intellectual Property Management Co., Ltd., Osaka (JP)

(72) Inventors: Yusuke Tanji, Osaka (JP); Hideki Tamura, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 171 days.

(21) Appl. No.: 15/547,510

(22) PCT Filed: Mar. 11, 2016

(86) PCT No.: PCT/JP2016/001385
§ 371 (c)(1),
(2) Date: Jul. 30, 2017

(87) PCT Pub. No.: WO2016/157758
PCT Pub. Date: Oct. 6, 2016

(65) Prior Publication Data
US 2018/0034322 A1    Feb. 1, 2018

(30) Foreign Application Priority Data

Mar. 31, 2015 (JP) .................. 2015-073134

(51) Int. Cl.
*H02J 50/12* (2016.01)
*B60M 7/00* (2006.01)
(Continued)

(52) U.S. Cl.
CPC .............. *H02J 50/12* (2016.02); *B60L 53/30* (2019.02); *B60M 7/00* (2013.01); *B60L 53/12* (2019.02);
(Continued)

(58) Field of Classification Search
USPC ........................................................ 307/104
See application file for complete search history.

(56) References Cited

U.S. PATENT DOCUMENTS

2014/0091637 A1    4/2014    Endo et al.
2014/0175894 A1*   6/2014    Endo ...................... H02J 17/00
                                                              307/104
(Continued)

FOREIGN PATENT DOCUMENTS

JP    H10-225129 A     8/1998
JP    2005-313884 A    11/2005
(Continued)

OTHER PUBLICATIONS

International Search Report and Written Opinion for International Application No. PCT/JP2016/001385, dated Mar. 31, 2015.

*Primary Examiner* — Rexford N Barnie
*Assistant Examiner* — Xuan Ly
(74) *Attorney, Agent, or Firm* — Renner, Otto, Boisselle & Sklar, LLP

(57) ABSTRACT

A control circuit is configured to adjust a phase difference which is a delay of the phase of each of the second drive signals to the phase of each of the first drive signals to a set value within a prescribed range to adjust the magnitude of output power. The control circuit includes an estimator and a setter. The estimator estimates whether an initial mode which is an operation mode of an inverter circuit in the case of a variable capacitance circuit being disabled is a leading phase mode or a lagging phase mode while the variable (Continued)

capacitance circuit is operating. The setter sets the prescribed range in accordance with the initial mode estimated by the estimator.

14 Claims, 15 Drawing Sheets

(51) Int. Cl.
    *B60L 53/30*     (2019.01)
    *H02M 7/5387*     (2007.01)
    *B60L 53/12*     (2019.01)

(52) U.S. Cl.
    CPC ........ *H02M 7/5387* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/14* (2013.01)

(56) References Cited

U.S. PATENT DOCUMENTS

| | | | |
|---|---|---|---|
| 2015/0326028 A1* | 11/2015 | Suzuki | H02J 7/025 307/104 |
| 2017/0141618 A1 | 5/2017 | Endo et al. | |

FOREIGN PATENT DOCUMENTS

| | | |
|---|---|---|
| JP | 2013-070590 A | 4/2013 |
| JP | 2013-243929 A | 12/2013 |
| JP | 2014-093829 A | 5/2014 |
| JP | 2014-155418 A | 8/2014 |
| WO | WO 2012/164846 | 12/2012 |
| WO | WO 2016/143359 A | 9/2016 |

\* cited by examiner

FREQUENCY

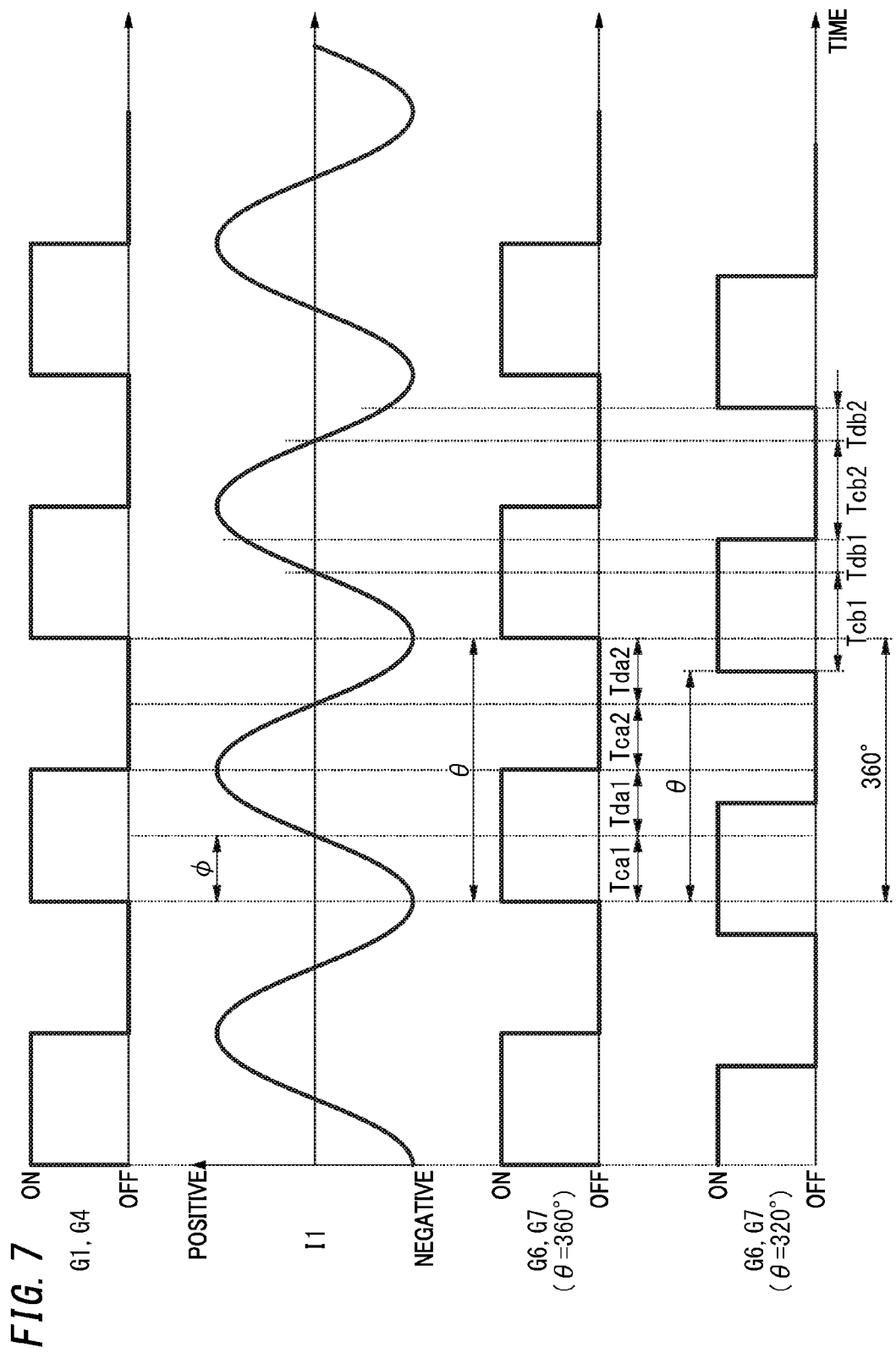

NON-CONTACT POWER SUPPLY APPARATUS, PROGRAM, METHOD FOR CONTROLLING NON-CONTACT POWER SUPPLY APPARATUS, AND NON-CONTACT POWER TRANSMISSION SYSTEM

TECHNICAL FIELD

The present invention generally relates to non-contact power supply apparatuses, programs, methods for controlling the non-contact power supply apparatuses, and non-contact power transmission systems. More specifically, the present invention relates to a non-contact power supply apparatus, a program, a method for controlling the non-contact power supply apparatus, and a non-contact power transmission system that are for supplying power to a load in a non-contact manner.

BACKGROUND ART

A non-contact power supply apparatus configured to supply power to a load by using electromagnetic induction in a non-contact manner has been proposed (e.g., see Patent Literature 1).

The non-contact power supply apparatus described in Patent Literature 1 includes a primary coil (power feeding coil) configured to generate a magnetic field to supply electric power and is used to feed power to a mobile object such as an electric car. The electric car includes a non-contact power reception apparatus. The non-contact power reception apparatus includes a secondary coil (power receiving coil) and a storage battery and accumulates electric power supplied from the primary coil of the non-contact power supply apparatus to the secondary coil in the storage battery.

However, in such a non-contact power supply apparatus, the coupling coefficient between the primary coil and the secondary coil changes depending on the relative positional relationship between the primary coil of the non-contact power supply apparatus and the secondary coil of the load (mobile object). Thus, when the relative positional relationship between the primary coil and the secondary coil changes, output power output from the non-contact power supply apparatus decreases, and the output power may be smaller than required electric power.

CITATION LIST

Patent Literature

Patent Literature 1: JP 2013-243929 A

SUMMARY OF INVENTION

In view of the above problems, it is an object of the present invention to provide a non-contact power supply apparatus, a program, a method for controlling the non-contact power supply apparatus, and a non-contact power transmission system which easily secure required electric power even when the relative positional relationship between a primary coil and a secondary coil changes.

A non-contact power supply apparatus according to one aspect of the present invention includes an inverter circuit, a primary coil, a variable capacitance circuit, and a control circuit. The inverter circuit includes a plurality of conversion switching elements electrically connected between a pair of input points and a pair of output points. The inverter circuit is configured to convert a direct-current voltage applied to the pair of input points into an alternating-current voltage by switching the plurality of conversion switching elements and to output the alternating-current voltage from the pair of output points. The primary coil is electrically connected between the output points in the pair and is configured to supply output power to a secondary coil in a non-contact manner when the alternating-current voltage is applied to the primary coil. The variable capacitance circuit is electrically connected between the pair of output points and the primary coil. The variable capacitance circuit includes an adjustment capacitor and a plurality of adjustment switching elements. The variable capacitance circuit is configured to adjust a magnitude of a capacity component between the pair of output points and the primary coil by switching the plurality of adjustment switching elements. The control circuit is configured to control the plurality of conversion switching elements by a first drive signal and to control the plurality of adjustment switching elements by a second drive signal. The control circuit is configured to adjust a phase difference which is a delay of a phase of the second drive signal to a phase of the first drive signal to a set value within a prescribed range to adjust a magnitude of the output power. The control circuit includes an estimator and a setter. The estimator is configured to, while the variable capacitance circuit is in operation, estimate whether an initial mode which is an operation mode of the inverter circuit in a case of the variable capacitance circuit being disabled is a leading phase mode or a lagging phase mode. The setter is configured to set the prescribed range in accordance with the initial mode estimated by the estimator.

A program according to one aspect of the present invention causes a computer to function as a controller, an estimator, and a setter, wherein the computer is used in a non-contact power supply apparatus. The non-contact power supply apparatus includes an inverter circuit, a primary coil, and a variable capacitance circuit. The inverter circuit includes a plurality of conversion switching elements electrically connected between a pair of input points and a pair of output points. The inverter circuit is configured to convert a direct-current voltage applied to the pair of input points into an alternating-current voltage by switching the plurality of conversion switching elements and to output the alternating-current voltage from the pair of output points. The primary coil is electrically connected between the output points in the pair and is configured to supply output power to a secondary coil in a non-contact manner when the alternating-current voltage is applied to the primary coil. The variable capacitance circuit is electrically connected between the pair of output points and the primary coil. The variable capacitance circuit includes an adjustment capacitor and a plurality of adjustment switching elements. The variable capacitance circuit is configured to adjust a magnitude of a capacity component between the pair of output points and the primary coil by switching the plurality of adjustment switching elements. The controller is configured to control the plurality of conversion switching elements by a first drive signal and to control the plurality of adjustment switching elements by a second drive signal. The controller is configured to adjust a phase difference which is a delay of a phase of the second drive signal to a phase of the first drive signal to a set value within a prescribed range to adjust a magnitude of the output power. The estimator is configured to, while the variable capacitance circuit is in operation, estimate whether an initial mode which is an operation mode of the inverter circuit in a case of the variable capacitance circuit being disabled is a leading phase mode or a lagging phase mode. The setter is configured to set the prescribed range in accordance with the initial mode estimated by the estimator.

A method for controlling a non-contact power supply apparatus according to one aspect of the present invention includes a control step, an estimation step, and a setting step. The non-contact power supply apparatus includes an inverter circuit, a primary coil, and a variable capacitance circuit. The inverter circuit includes a plurality of conversion switching elements electrically connected between a pair of input points and a pair of output points. The inverter circuit is configured to convert a direct-current voltage applied to the pair of input points into an alternating-current voltage by switching the plurality of conversion switching elements and to output the alternating-current voltage from the pair of output points. The primary coil is electrically connected between the output points in the pair and is configured to supply output power to a secondary coil in a non-contact manner when the alternating-current voltage is applied to the primary coil. The variable capacitance circuit is electrically connected between the pair of output points and the primary coil. The variable capacitance circuit includes an adjustment capacitor and a plurality of adjustment switching elements. The variable capacitance circuit is configured to adjust a magnitude of a capacity component between the pair of output points and the primary coil by switching the plurality of adjustment switching elements. In the control step, the plurality of conversion switching elements are controlled by a first drive signal, and the plurality of adjustment switching elements are controlled by a second drive signal. In the control step, a phase difference which is a delay of a phase of the second drive signal to a phase of the first drive signal is adjusted to a set value within a prescribed range to adjust a magnitude of the output power. In the estimation step, whether an initial mode which is an operation mode of the inverter circuit in a case of the variable capacitance circuit being disabled is a leading phase mode or a lagging phase mode is estimated while the variable capacitance circuit is in operation. In the setting step, the prescribed range is set according to the initial mode estimated in the estimation step.

A non-contact power transmission system according to one aspect of the present invention includes the non-contact power supply apparatus and a non-contact power reception apparatus including the secondary coil. The non-contact power reception apparatus is configured to be supplied with the output power from the non-contact power supply apparatus in a non-contact manner.

BRIEF DESCRIPTION OF DRAWINGS

FIG. 7 is a waveform diagram illustrating a first drive signal, a primary current, and a second drive signal in the case where a V-I phase difference in the non-contact power supply apparatus is 90 degrees;

DESCRIPTION OF EMBODIMENTS

Figure 1:
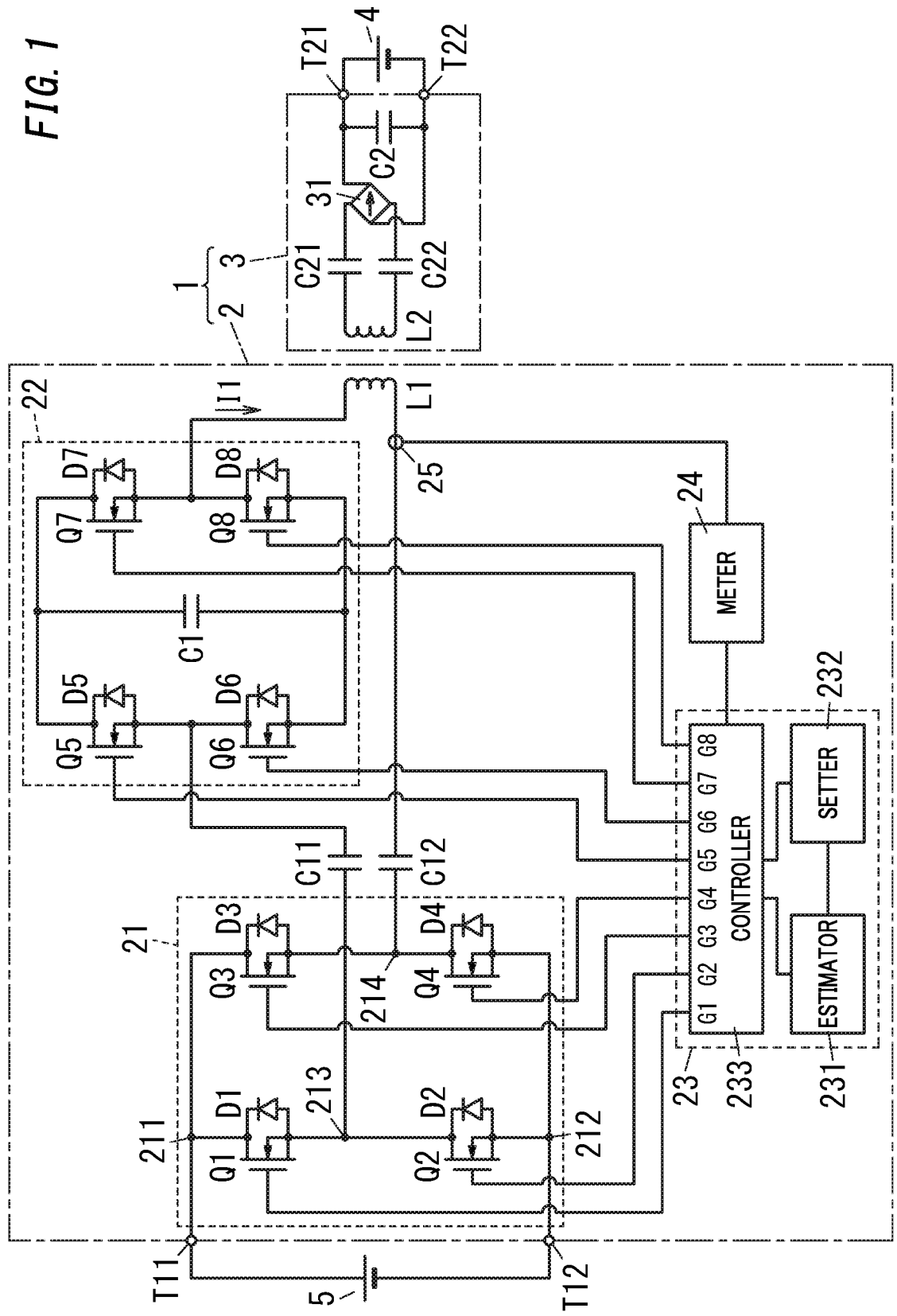
FIG. 1 is a circuit diagram illustrating a non-contact power transmission system according to an embodiment of the present invention.

A non-contact power supply apparatus of the present embodiment supplies power to a load in a non-contact manner. The non-contact power supply apparatus transfers electric power from a primary coil included in the non-contact power supply apparatus to a secondary coil included in the load to supply power to the load, with the primary coil and the secondary coil being in an electromagnetically (at least either electrically or magnetically) coupled state. Such a non-contact power supply apparatus and a non-contact power reception apparatus included in the load form a non-contact power transmission system.

<Outline of Non-Contact Power Transmission System>

First, with reference to FIG. 1, an outline of the non-contact power transmission system will be described.

A non-contact power transmission system 1 includes a non-contact power supply apparatus 2 including a primary coil L1 and a non-contact power reception apparatus 3 including a secondary coil L2. The non-contact power reception apparatus 3 is configured receive output power from the non-contact power supply apparatus 2 in a non-contact manner. The output power here is electric power output from the non-contact power supply apparatus 2 and supplied from the primary coil L1 to the secondary coil L2 in a non-contact manner when an alternating-current voltage is applied to the primary coil L1.

In the present embodiment, an example will be described in which the non-contact power reception apparatus 3 is mounted on an electric vehicle serving as the load. The electric vehicle is a vehicle including a storage battery 4 and propelled by using electrical energy accumulated in the storage battery 4. The non-contact power reception apparatus 3 mounted on the electric vehicle is used as a charger of the storage battery 4. Note that while an electric car propelled by using driving force generated by an electric motor is described as an example of an electric vehicle, the electric vehicle is not limited to the electric car but may be a two-wheel vehicle (electric motorcycle), an electric bicycle, or the like.

The non-contact power supply apparatus 2 supplies electric power supplied from a power generating facility such as a commercial power supply (system power supply) or a photovoltaic power generating facility to the non-contact power reception apparatus 3 to charge the storage battery 4 of the electric vehicle. Electric power supplied to the non-contact power supply apparatus 2 may be either alternating-current power or direct-current power, but in the present embodiment, a case where the non-contact power supply apparatus 2 is electrically connected to a direct-current power supply 5 and direct-current power is supplied to the non-contact power supply apparatus 2 will be described as an example. Note that when alternating-current power is supplied to the non-contact power supply apparatus 2, the non-contact power supply apparatus 2 includes an AC/DC converter configured to convert an alternating current into a direct current.

The non-contact power supply apparatus 2 is installed in a parking lot of, for example, a commercial facility, a public facility, a multiple dwelling house, or the like. At least the primary coil L1 of the non-contact power supply apparatus 2 is installed on a floor or ground, and the non-contact power supply apparatus 2 supplies electric power to the non-contact power reception apparatus 3 of an electric vehicle parked above the primary coil L1 in a non-contact manner. Here, the secondary coil L2 of the non-contact power reception apparatus 3 is located above the primary coil L1 so as to be electromagnetically (at least either electrically or magnetically) coupled to the primary coil L1. Thus, the output power from the primary coil L1 is transferred (transmitted) to the secondary coil L2. Note that the primary coil L1 does not necessarily have to be installed to be exposed from a floor or ground but may be embedded in a floor or ground.

The non-contact power reception apparatus 3 includes the secondary coil L2, a pair of secondary capacitors C21 and C22, a rectifier circuit 31, and a smoothing capacitor C2. The rectifier circuit 31 includes a diode bridge including a pair of alternating-current input points and a pair of direct-current output points. The secondary coil L2 has one end electrically connected to one of the alternating-current input points of the rectifier circuit 31 via the first secondary capacitor C21. The secondary coil L2 has the other end electrically connected to the other of the alternating-current input points of the rectifier circuit 31 via the second secondary capacitor C22. The smoothing capacitor C2 is electrically connected between the direct-current output points in the pair in the rectifier circuit 31. Moreover, the smoothing capacitor C2 has both ends electrically connected to respective output terminals T21 and T22 which are paired. The storage battery 4 is electrically connected to the pair of output terminals T21 and T22.

Thus, the non-contact power reception apparatus 3 rectifies by the rectifier circuit 31 an alternating-current voltage generated across the secondary coil L2 by receiving the output power from the primary coil L1 of the non-contact power supply apparatus 2 by the secondary coil L2 and further smoothes the alternating-current voltage by the smoothing capacitor C2 to obtain a direct-current voltage. The non-contact power reception apparatus 3 outputs (applies) the thus obtained direct-current voltage from the pair of output terminals T21 and T22 to the storage battery 4.

Here, in the present embodiment, the non-contact power supply apparatus 2 includes a variable capacitance circuit 22 and a pair of primary capacitors C11 and C12. The variable capacitance circuit 22 and the primary coil L1 form a resonance circuit (hereinafter referred to as a "primary resonance circuit"). Moreover, in the non-contact power reception apparatus 3, the secondary coil L2 and the pair of secondary capacitors C21 and C22 form a resonance circuit (hereinafter referred to as a "secondary resonance circuit"). The non-contact power transmission system 1 of the present embodiment adopts a magnetic field resonance method (magnetic resonance method) for producing resonance of the primary resonance circuit with the secondary resonance circuit to transmit electric power. That is, the non-contact power transmission system 1 matches the resonance frequency of the primary resonance circuit and the resonance frequency of the secondary resonance circuit with each other to enable highly efficient transmission of the output power of the non-contact power supply apparatus 2 even when the primary coil L1 and the secondary coil L2 are relatively far away from each other.

<Outline of Non-Contact Power Supply Apparatus>

Next, with reference to FIG. 1, an outline of the non-contact power supply apparatus will be described.

The non-contact power supply apparatus 2 of the present embodiment further includes an inverter circuit 21, the variable capacitance circuit 22, and a control circuit 23 in addition to the primary coil L1.

The inverter circuit 21 includes a plurality of (here, four) conversion switching elements Q1 to Q4 electrically connected between a pair of input points 211 and 212 and a pair of output points 213 and 214. The inverter circuit 21 converts a direct-current voltage applied to the pair of input points 211 and 212 into an alternating-current voltage by switching the plurality of conversion switching elements Q1 to Q4 and outputs the alternating-current voltage from the pair of output points 213 and 214.

The primary coil L1 is electrically connected between the output points 213 and 214 in the pair and supplies output power to the secondary coil L2 in a non-contact manner when the alternating-current voltage is applied to the primary coil L1.

The variable capacitance circuit 22 is electrically connected between the pair of output points 213 and 214 and the primary coil L1 and includes an adjustment capacitor C1 and a plurality of (heir, four) adjustment switching elements Q5 to Q8. The variable capacitance circuit 22 adjusts the magnitude of a capacity component between the pair of output points 213 and 214 and the primary coil L1 by switching the plurality of adjustment switching elements Q5 to Q8.

The control circuit 23 controls the plurality of conversion switching elements Q1 to Q4 by a first drive signal and controls the plurality of adjustment switching elements Q5 to Q8 by a second drive signal. The control circuit 23 is configured to adjust a phase difference which is a delay of a phase of the second drive signal to a phase of the first drive signal to a set value within a prescribed range to adjust the magnitude of the output power. The control circuit 23 includes an estimator 231 and a setter 232. The estimator 231 is configured to, while the variable capacitance circuit 22 is operating, estimate whether an initial mode which is an operation mode of the inverter circuit 21 in a case of the variable capacitance circuit 22 being disabled is a leading phase mode or a lagging phase mode. The setter 232 is configured to set the prescribed range in accordance with the initial mode estimated by the estimator 231.

The "phase difference" here is a delay of the phase of each of second drive signals G6 and G7 to the phase of each of first drive signals G1 and G4 or a delay of the phase of each of second drive signals G5 and G8 to the phase of each of first drive signals G2 and G3. This point will be described later in detail in "(2) With Variable Capacitance Circuit" of "Basic Operation." Moreover, the "leading phase mode" here is a mode in which a current phase leads (becomes a leading phase of) a voltage phase, whereas the "lagging phase mode" here is a mode in which the current phase lags behind (becomes a lagging phase of) the voltage phase.

With this configuration, the non-contact power supply apparatus 2 of the present embodiment provides the advantage that even when the relative positional relationship between the primary coil L1 and the secondary coil L2 changes, required electric power is easily secured. That is, the non-contact power supply apparatus 2 adjusts the phase difference, which is a delay of the phase of each of the second drive signals G6 and G7 (G5 and G8) to the phase of each of the first drive signals G1 and G4 (G2 and G3), to the set value within the prescribed range, thereby enabling adjustment of the magnitude of the output power. Thus, even if a change in the relative positional relationship between the primary coil L1 and the secondary coil L2 changes the coupling coefficient between the primary coil L1 and the secondary coil L2, the non-contact power supply apparatus 2 easily secures required electric power by adjusting the phase difference. Moreover, since the phase difference is adjusted to the set value within the prescribed range, the inverter circuit 21 is operable in the lagging phase mode when the prescribed range satisfies prescribed conditions. Note that the prescribed conditions under which the inverter circuit 21 operates in the lagging phase mode is not invariable but varies depending on the initial mode (the operation mode of the inverter circuit 21 in the case of the variable capacitance circuit 22 being disabled). Here, while the variable capacitance circuit 22 is operating, the control circuit 23 estimates whether the initial mode is the leading phase mode or the lagging phase mode by the estimator 231, and the control circuit 23 sets the prescribed range by the setter 232 in accordance with the initial mode which has been estimated. Thus, the non-contact power supply apparatus 2 of the present embodiment is capable of setting the prescribed range to an optimal range according to the initial mode to enable the inverter circuit 21 to operate in the lagging phase mode.

Note that the "input point" and the "output point" mentioned in the present embodiment do not have to be entities as components (terminals) for connection to electric wires and the like and may be, for example, parts of a lead of an electronic component or a conductor included in a circuit board.

<Circuit Configuration>

Next, with reference to FIG. 1, a specific circuit configuration of the non-contact power supply apparatus 2 of the present embodiment will be described.

The non-contact power supply apparatus 2 of the present embodiment includes the pair of input terminals T11 and T12. The direct-current power supply 5 is electrically connected to the pair of input terminals T11 and T12.

The inverter circuit 21 is a full-bridge inverter circuit including a full-bridge connection of the four conversion switching elements Q1 to Q4. That is, the inverter circuit 21 includes a first arm and a second arm electrically connected in parallel to each other between the input points 211 and 212 in the pair, and the first arm and the second arm includes the four conversion switching elements Q1 to Q4. The first arm includes a series circuit of the (first) conversion switching element Q1 and the (second) conversion switching element Q2. The second arm includes a series circuit of the (third) conversion switching element Q3 and the (fourth) conversion switching element Q4. A midpoint of the first arm (a connection point of the conversion switching elements Q1 and Q2) and a midpoint of the second arm (a connection point of the conversion switching elements Q3 and Q4) are respectively the output points 213 and 214 in the pair. In the present embodiment, the four conversion switching elements Q1 to Q4 are each an n-channel depletion Metal-Oxide-Semiconductor Field-Effect Transistor (MOSFET).

More specifically, the pair of input points 211 and 212 is electrically connected to the pair of input terminals T11 and T12 such that the first input point 211 is adjacent to the positive electrode of the direct-current power supply 5 and the second input point 212 is adjacent to the negative electrode of the direct-current power supply 5. The drains of the conversion switching elements Q1 and Q3 are electrically connected to the first input point 211. The sources of the conversion switching elements Q2 and Q4 are electrically connected to the second input point 212. A connection point of the source of the conversion switching element Q1 and the drain of the conversion switching element Q2 is the first output point 213 of the inverter circuit 21. A connection point of the source of the conversion switching element Q3 and the drain of the conversion switching element Q4 is the second output point 214 of the inverter circuit 21.

The four conversion switching elements Q1 to Q4 are electrically connected to four diodes D1 to D4 respectively. The diode D1 is electrically connected between the drain and the source of the conversion switching element Q1. The diode D2 is electrically connected between the drain and the source of the conversion switching element Q2. The diode D3 is electrically connected between the drain and the source of the conversion switching element Q3. The diode D4 is electrically connected between the drain and the source of the conversion switching element Q4. The diodes D1 the D4 are connected to the conversion switching elements Q1 to Q4 in such an orientation that the cathodes of the diodes D1 to D4 are adjacent to the drains of the conversion switching elements Q1 to Q4, respectively. Here, the diodes D1 to D4 are parasitic diodes of the conversion switching elements Q1 to Q4, respectively.

The variable capacitance circuit 22 includes an adjustment capacitor C1 and the four adjustment switching elements Q5 to Q8. The variable capacitance circuit 22 includes a third arm and a fourth arm which are electrically connected in parallel to each other between the output points 213 and 214 in the pair in the inverter circuit 21. The third arm and the fourth arm include the four adjustment switching elements Q5 to Q8. The third arm includes a series circuit of the (first) adjustment switching element Q5 and the (third) adjustment switching element Q7. The fourth arm includes a series circuit of the (second) adjustment switching element Q6 and the (fourth) adjustment switching element Q8. The adjustment capacitor C1 is electrically connected between a midpoint of the third arm (a connection point of the adjustment switching elements Q5 and Q7) and a midpoint of the fourth arm (a connection point of the adjustment switching elements Q6 and Q8). In the present embodiment, the four adjustment switching elements Q5 to Q8 are each an n-channel depletion MOSFET.

More specifically, the source of the adjustment switching element Q5 and the drain of the adjustment switching element Q6 are electrically connected to the first output point 213 of the inverter circuit 21 via the first primary capacitor C11. The source of the adjustment switching element Q7 and the drain of the adjustment switching element Q8 are electrically connected to the second output point 214 via the second primary capacitor C12 and the primary coil L1. The adjustment capacitor C1 has one end electrically connected to a connection point of the drain of the adjustment switching element Q5 and the drain of the adjustment switching element Q7. The adjustment capacitor C1 has the other end electrically connected to a connection point of the source of the adjustment switching element Q6 and the source of the adjustment switching element Q8.

The four adjustment switching elements Q5 to Q8 are electrically connected to four diodes D5 to D8 respectively. The diode D5 is electrically connected between the drain and the source of the adjustment switching element Q5. The diode D6 is electrically connected between the drain and the source of the adjustment switching element Q6. The diode D7 is electrically connected between the drain and the source of the adjustment switching element Q7. The diode D8 is electrically connected between the drain and the source of the adjustment switching element Q8. The diodes D5 to D8 are connected to the adjustment switching elements Q5 to Q8 in such an orientation that the cathodes of the diodes D5 to D8 are adjacent to the drains of the adjustment switching elements Q5 to Q8, respectively. Here, the diodes D5 to D8 are parasitic diodes of the adjustment switching elements Q5 to Q8, respectively.

The control circuit 23 includes, for example, a microcomputer as a main component. The microcomputer causes a Central Processing Unit (CPU) to execute a program stored in a memory of the microcomputer to realize the function as the control circuit (controller) 23. The program may be stored in the memory of the microcomputer in advance, provided as a recording medium such as a memory card in which the program is stored, or provided via an electric communication line. In the present embodiment, the control circuit 23 includes a controller 233 in addition to the estimator 231 and the setter 232. In other words, the program is a program for causing a computer (here, a microcomputer) used in the non-contact power supply apparatus 2 to function as the controller 233, the estimator 231, and the setter 232.

The controller 233 outputs the first drive signals G1 to G4 for switching on/off respectively of the conversion switching elements Q1 to Q4 of the inverter circuit 21. The four first drive signals G1 to G4 respectively correspond to the four conversion switching elements Q1 to Q4. Here, the controller 233 outputs the first drive signals G1 to G4 to the gates of the conversion switching elements Q1 to Q4 to control the conversion switching elements Q1 to Q4, respectively.

The controller 233 outputs the second drive signals G5 to G8 for switching on/off respectively of the four adjustment switching elements Q5 to Q8 of the variable capacitance circuit 22. The four second drive signals G5 to G8 respectively correspond to the four adjustment switching elements Q5 to Q8. Here, the controller 233 outputs the second drive signals G5 to G8 to the gates of the adjustment switching elements Q5 to Q8 to control the adjustment switching elements Q5 to Q8, respectively.

Note that in the present embodiment, the controller 233 of the control circuit 23 directly outputs the first drive signals G1 to G4 and the second drive signals G5 to G8 to the gates of the conversion switching elements Q1 to Q4 and the adjustment switching elements Q5 to Q8 respectively, but the configuration of the controller 233 is not limited to this configuration. For example, the non-contact power supply apparatus 2 may further include a drive circuit, and the drive circuit may receive the first drive signals G1 to G4 and the second drive signals G5 to G8 from the controller 233 of the control circuit 23 to drive the conversion switching elements Q1 to Q4 and the adjustment switching elements Q5 to Q8 respectively.

The primary coil L1 is electrically connected in series to the pair of primary capacitors C11 and C12 and the variable capacitance circuit 22 at the pair of output points 213 and 214 of the inverter circuit 21. The primary coil L1 has one end electrically connected to the first output point 213 of the inverter circuit 21 via the variable capacitance circuit 22 and the first primary capacitor C11. The primary coil L1 has the other end electrically connected to the second output point 214 of the inverter circuit 21 via the second primary capacitor C12.

The non-contact power supply apparatus 2 of the present embodiment further includes a meter 24 configured to measure the magnitude of a current flowing through the primary coil L1 as a measured value. Between the primary coil L1 and the second primary capacitor C12, a current sensor 25 including, for example, a current transformer is provided. The meter 24 receives an output of the current sensor 25 and measures the magnitude of a current flowing through the primary coil L1 as the measured value. The meter 24 is configured to output the measured value to the control circuit 23. The control circuit 23 monitors the magnitude of output power output from the primary coil L1 by using the measured value measured by the meter 24.

<Basic Operation>

Next, with reference to FIGS. 1 and 2, basic operation of the non-contact power supply apparatus 2 of the present embodiment will be described. In FIG. 2, the horizontal axis is a time axis, and signal waveforms of the first drive signals "G1, G4," and "G2, G3" and the second drive signals "G5, G8," and "G6, G7" are shown sequentially from top to bottom. Note that "ON" and "OFF" in FIG. 2 represent on and off of corresponding switching elements (the conversion switching elements and the adjustment switching elements).

(1) Without Variable Capacitance Circuit

First, operation of the non-contact power supply apparatus 2 will be described in the case where the variable capacitance circuit 22 is not provided, that is, only the primary coil L1 and the pair of primary capacitors C11 and C12 are electrically connected between the output points 213 and 214 in the pair. The operation of the non-contact power supply apparatus 2 in this case is equivalent to the operation of the non-contact power supply apparatus 2 in the case where the operation of the variable capacitance circuit 22 is stopped in the circuit configuration of FIG. 1, that is, all the adjustment switching elements Q5 to Q8 of the variable capacitance circuit 22 are fixed in an on state.

As illustrated in FIG. 2, the controller 233 of the control circuit 23 generates signals, as the first drive signals G1 and G4 respectively corresponding to the conversion switching elements Q1 and Q4 and the first drive signals G2 and G3 respectively corresponding to the conversion switching elements Q2 and Q3, which are in anti-phase (with a phase difference of 180 degrees) to each other. Thus, in the inverter circuit 21, a pair of the first conversion switching element Q1 and the fourth conversion switching element Q4 and a pair of the second conversion switching element Q2 and the third conversion switching element Q3 are controlled to be alternately turned on.

As a result, a voltage (alternating-current voltage) whose polarity (positive/negative) is cyclically inverted is generated between the output points 213 and 214 in the pair in the inverter circuit 21. In sum, the inverter circuit 21 converts a direct-current voltage applied to the pair of input points 211 and 212 into an alternating-current voltage by switching the plurality of conversion switching elements Q1 to Q4 and outputs the alternating-current voltage from the pair of output points 213 and 214. In the following description, as to the output voltage of the inverter circuit 21, a voltage at which the first output point 213 of the pair of output points 213 and 214 has a high potential is referred to as a "positive polarity," and a voltage at which the second output point 214 has a high potential is referred to as a "negative polarity." That is, the output voltage of the inverter circuit 21 is the positive polarity when the conversion switching elements Q1 and Q4 are in the on state, whereas the output voltage of the inverter circuit 21 is the negative polarity when the conversion switching elements Q2 and Q3 are in the on state.

As described above, the inverter circuit 21 outputs the alternating-current voltage from the pair of output points 213 and 214, so that an alternating current flows through the primary coil L1 electrically connected between the output points 213 and 214 in the pair, and the primary coil L1 generates a magnetic field. This enables the non-contact power supply apparatus 2 to supply output power from the primary coil L1 to the secondary coil L2 of the non-contact power reception apparatus 3 in a non-contact manner.

However, when the variable capacitance circuit 22 is not provided, in the non-contact power supply apparatus 2 of the present embodiment, the primary coil L1 and the pair of primary capacitors C11 and C12 form a primary resonance circuit. Thus, the magnitude of output power output from the primary coil L1 changes depending on the operation frequency of the inverter circuit 21 (i.e., frequencies of the first drive signals G1 to G4) and reaches a peak when the operation frequency of the inverter circuit 21 matches with the resonance frequency of the primary resonance circuit.

Figure 3:
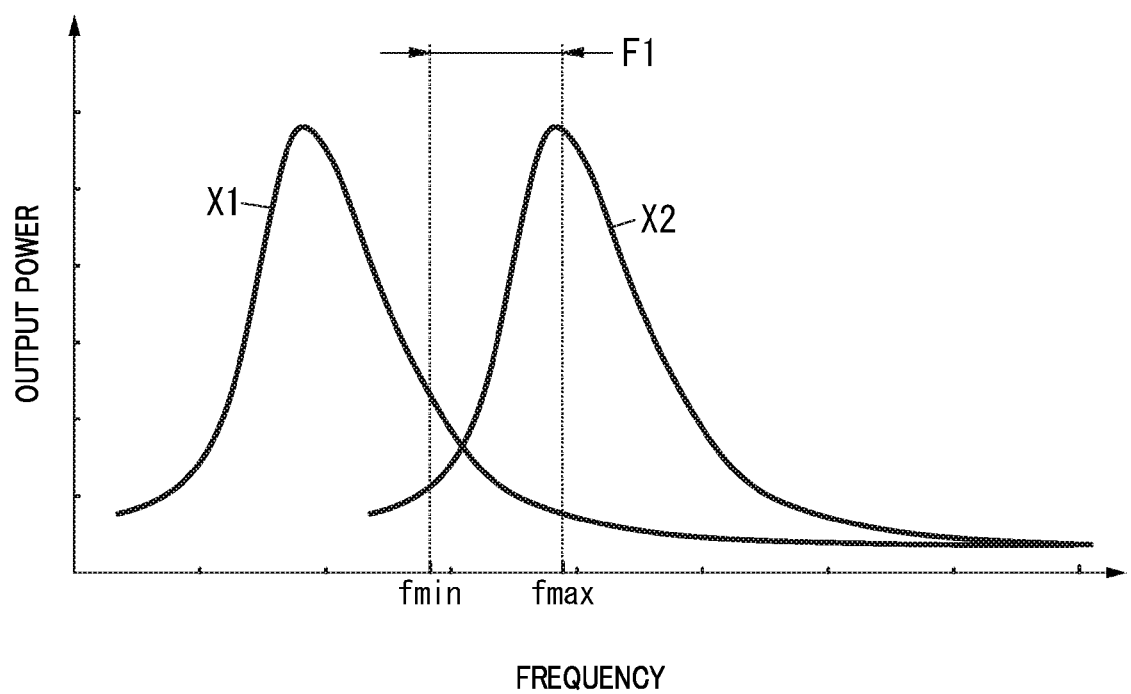
FIG. 3 is a graph illustrating an example of resonance characteristics of the non-contact power supply apparatus.

Here, when a change in the relative positional relationship between the primary coil L1 and the secondary coil L2 changes the coupling coefficient between the primary coil L1 and the secondary coil L2, the frequency characteristics of the output power of the non-contact power supply apparatus 2 (hereinafter referred to as "resonance characteristics") change. FIG. 3 shows a change in the resonance characteristics of the non-contact power supply apparatus 2 in the case where the relative positional relationship between the primary coil L1 and the secondary coil L2 changes. Note that in FIG. 3, the horizontal axis represents the frequency (the operation frequency of the inverter circuit 21), the vertical axis represents the output power of the non-contact power supply apparatus 2, and the resonance characteristics of the non-contact power supply apparatus 2 in the case of different relative positional relationship between the primary coil L1 and the secondary coil L2 are denoted by "X1" and "X2."

Here, as illustrated in FIG. 3, it is assumed that a frequency band (hereinafter referred to as an "allowed frequency band F1") usable as the operation frequency of the inverter circuit 21 is limited. The allowed frequency band F1 is specified by, for example, a low such as the radio act. In this case, frequencies lower than the lower limit value fmin of the allowed frequency band F1 and frequencies higher the upper limit value fmax of the allowed frequency band F1 is unusable as the operation frequency of the inverter circuit 21. In such cases, when the resonance characteristics of the non-contact power supply apparatus 2 are in, for example, a state as indicated by "X1" in FIG. 3, any adjustment of the operation frequency of the inverter circuit 21 may not achieve a necessary magnitude (hereinafter referred to as a "target value") of the output power of the non-contact power supply apparatus 2.

Figure 4A:
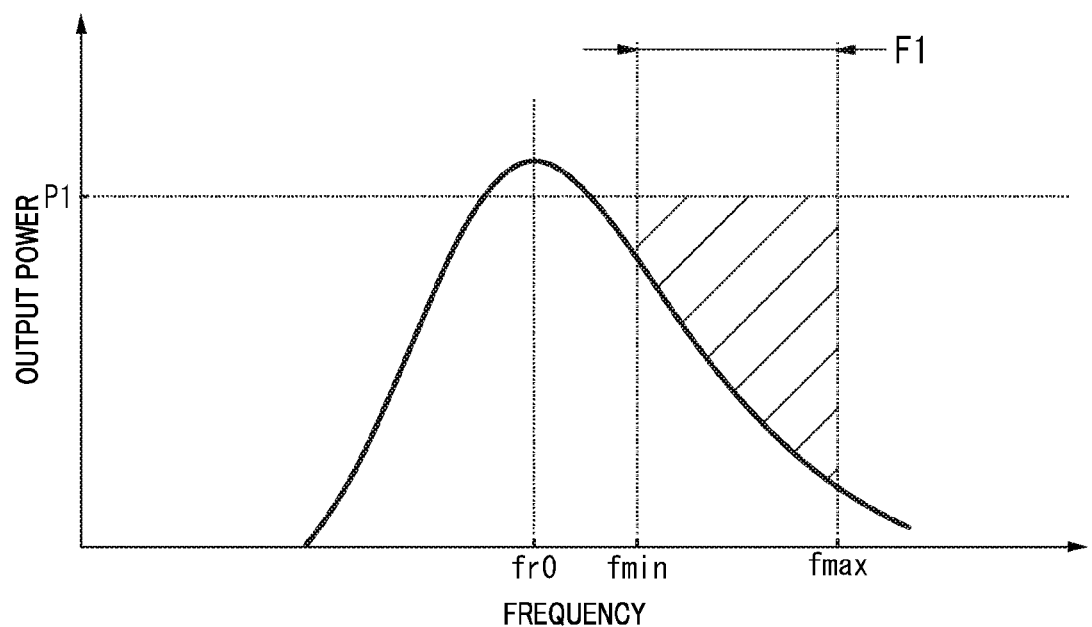
FIGS. 4A and 4B are graphs illustrating examples of resonance characteristics of the non-contact power supply apparatus.
Figure 4B:
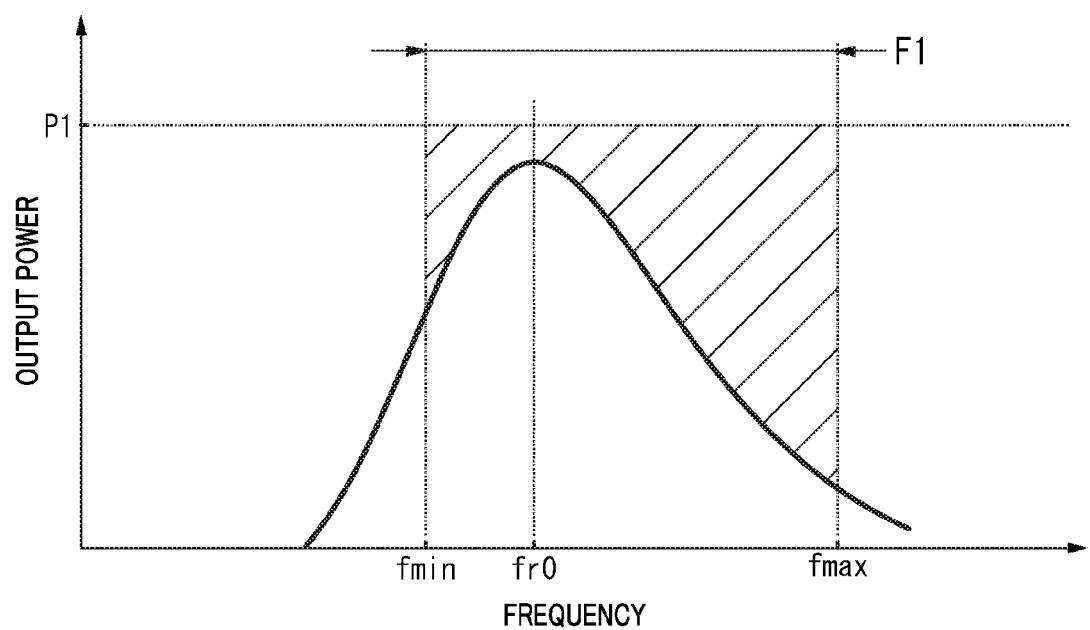

For example, as illustrated in FIG. 4A, if the primary resonance circuit has a resonance frequency fr away from the allowed frequency band F1, the magnitude of the output power of the non-contact power supply apparatus 2 does not reach the peak, and consequently, the output power may be smaller than a target value P1. Alternatively, for example, as illustrated in FIG. 4B, even when the resonance frequency fr of the primary resonance circuit is within the allowed frequency band F1, the peak of the output power of the non-contact power supply apparatus 2 does not reach the target value P1, and consequently, the output power may be smaller than the target value P1. That is, in the examples of FIGS. 4A and 4B, electric power in hatched (shaded) area is smaller than the target value P1.

Thus, the non-contact power supply apparatus 2 of the present embodiment is provided with the variable capacitance circuit 22 to render the resonance characteristics of the non-contact power supply apparatus 2 variable and has a function of correcting the magnitude of the output power so as to satisfy the target value P1.

(2) With Variable Capacitance Circuit

Figure 2:
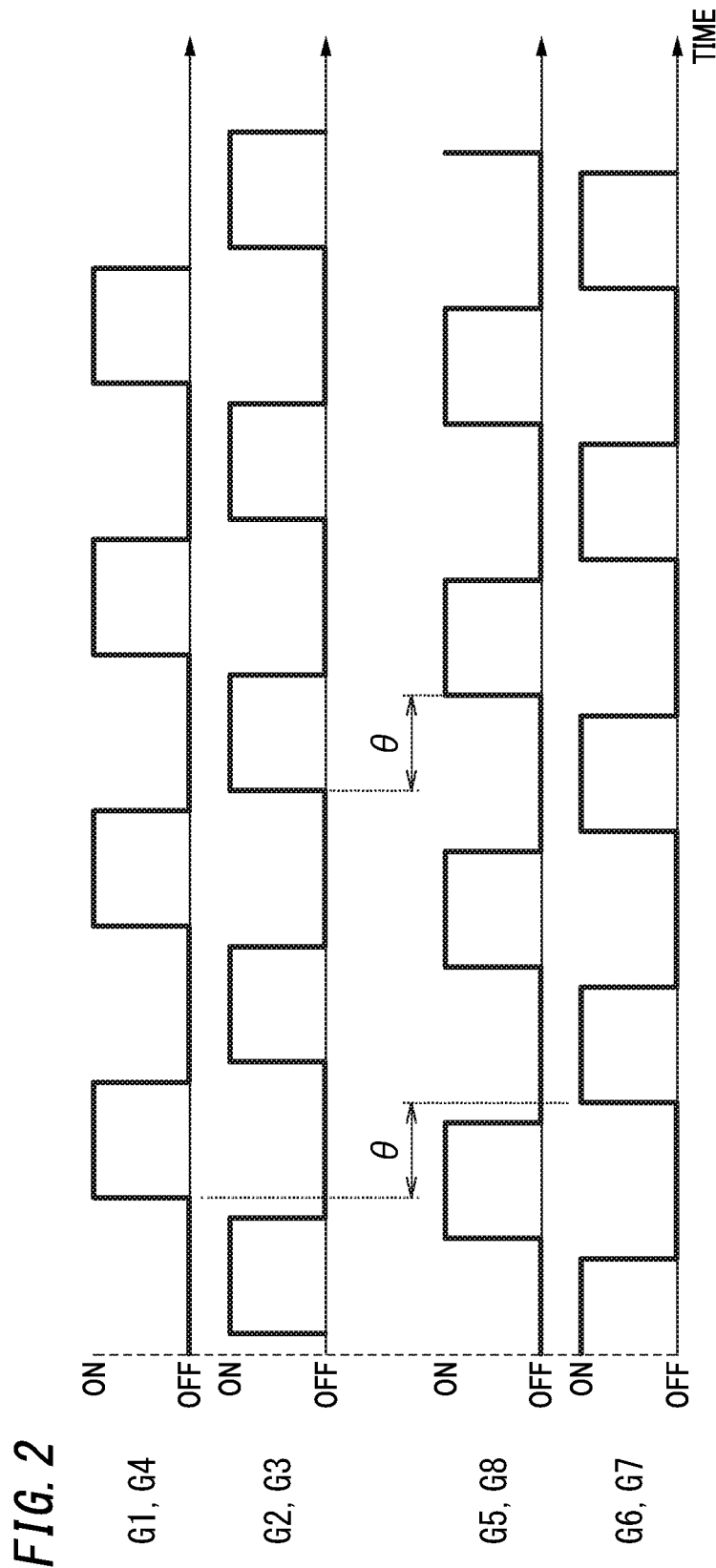
FIG. 2 is a waveform diagram illustrating first drive signals and second drive signals of a non-contact power supply apparatus according to the embodiment of the present invention.

Next, a description is given of operation of the non-contact power supply apparatus 2 in the case where the variable capacitance circuit 22 is provided as illustrated in FIG. 1, that is, the primary coil L1, the pair of primary capacitors C11 and C12, and the variable capacitance circuit 22 are electrically connected between the output points 213 and 214 in the pair.

As illustrated in FIG. 2, the controller 233 of the control circuit 23 generates signals, as the second drive signals G6 and G7 respectively corresponding to the adjustment switching elements Q6 and Q7 and the second drive signals G5 and G8 respectively corresponding to the adjustment switching elements Q5 and Q8, which are in anti-phase (with a phase difference of 180 degrees) to each other. Thus, in the variable capacitance circuit 22, a pair of the second adjustment switching element Q6 and the third adjustment switching element Q7 and a pair of the first adjustment switching element Q5 and the fourth adjustment switching element Q8 are controlled to be alternately turned on. In the present embodiment, the controller 233 of the control circuit 23 controls the frequencies of the first drive signals G1 to G4 and the frequencies of the second drive signals G5 to G8 to be equal to each other.

When the output voltage of the inverter circuit 21 is the positive polarity during a period during which the adjustment switching elements Q5 and Q8 are on and the adjustment switching elements Q6 and Q7 are off, a voltage is applied to the adjustment capacitor C1 via the adjustment switching elements Q5 and Q8. That is, a state (hereinafter also referred to as a "first state") is achieved where the primary coil L1 is electrically connected via the adjustment capacitor C1 between the output points 213 and 214 in the pair in the inverter circuit 21.

On the other hand, when the output voltage of the inverter circuit 21 is the negative polarity during a period during which the adjustment switching elements Q5 and Q8 are on and the adjustment switching elements Q6 and Q7 are off, a current flows through the diode D7 and the adjustment switching element Q5. That is, a state (hereinafter also referred a "second state") is achieved where the primary coil L1 is electrically connected without the adjustment capacitor C1 between the output points 213 and 214 in the pair in the inverter circuit 21. In other words, the both ends of the adjustment capacitor C1 are bypassed by the diode D7 and the adjustment switching element Q5.

Moreover, when the output voltage of the inverter circuit 21 is the positive polarity during a period during which the adjustment switching elements Q6 and Q7 are on and the adjustment switching elements Q5 and Q8 are off, a current flows through the adjustment switching element Q6 and the diode D8. That is, a state (hereinafter also referred to as a "third state") is achieved where the primary coil L1 is electrically connected without the adjustment capacitor C1 between the output points 213 and 214 in the pair in the inverter circuit 21. In other words, the both ends of the adjustment capacitor C1 are bypassed by the adjustment switching element Q6 and the diode D8.

On the other hand, when the output voltage of the inverter circuit 21 is the negative polarity during a period during which the adjustment switching elements Q6 and Q7 are on and the adjustment switching elements Q5 and Q8 are off, a voltage is applied to the adjustment capacitor C1 via the adjustment switching elements Q6 and Q7. That is, a state (hereinafter also referred to as a "fourth state") is achieved where the primary coil L1 is electrically connected via the adjustment capacitor C1 between the output points 213 and 214 in the pair in the inverter circuit 21. Note that the polarity of the voltage applied to the adjustment capacitor C1 is reversed between the first state and the fourth state.

As described above, the variable capacitance circuit 22 switches between the state where the primary coil L1 is electrically connected via the adjustment capacitor C1 between the output points 213 and 214 in the pair and the state where the primary coil L1 is electrically connected without the adjustment capacitor C1 between the output points 213 and 214 in the pair. Thus, the magnitude of the capacity component between the pair of output points 213 and 214 and the primary coil L1 apparently changes. Here, the state of the variable capacitance circuit 22 depends on on/off of the plurality of adjustment switching elements Q5 to Q8 and the polarity of the output voltage of the inverter circuit 21. In sum, the variable capacitance circuit 22 adjusts the magnitude of the capacity component between the pair of output points 213 and 214 and the primary coil L1 by switching the plurality of adjustment switching elements Q5 to Q8.

Thus, in the non-contact power supply apparatus 2 of the present embodiment, the magnitude of the capacity component between the pair of output points 213 and 214 and the primary coil L1 is adjusted by the variable capacitance circuit 22 to enable a change in the resonance characteristics of the non-contact power supply apparatus 2. As a result, when the output power of the non-contact power supply apparatus 2 is smaller than the target value P1 as described above, the magnitude of the output power can be corrected by the variable capacitance circuit 22 so as to satisfy the target value P1.

Here, in the present embodiment, as described above, the first drive signals G1 and G4 respectively corresponding to the conversion switching elements Q1 and Q4 and the first drive signals G2 and G3 respectively corresponding to the conversion switching elements Q2 and Q3 are signals in anti-phase (with a phase difference of 180 degrees) to each other. Similarly, the second drive signals G6 and G7 respectively corresponding to the adjustment switching elements Q6 and Q7 and the second drive signals G5 and G8 respectively corresponding to the adjustment switching elements Q5 and Q8 are signals in anti-phase (with a phase difference of 180 degrees) to each other.

Here, a phase difference θ between the first drive signal and the second drive signal in the present embodiment is a delay of the phase of each of the second drive signals G6 and G7 to the phase of each of the first drive signals G1 and G4 or a delay of the phase of each of the second drive signals G5 and G8 to the phase of each of the first drive signals G2 and G3 (see FIG. 2). That is, since the delay of the phase of each of the second drive signals G6 and G7 to the phase of each of the first drive signals G1 and G4 and the delay of the phase of each of the second drive signals G5 and G8 to the phase of each of the first drive signals G1 and G4 are different from each other by 180 degrees, the value of the phase difference θ varies depending on the delay of a phase defined as the phase difference θ. Thus, in the present embodiment, the delay of the phase of each of the second drive signals G6 and G7 to the phase of each of the first drive signals G1 and G4 or the delay of the phase of each of the second drive signals G5 and G8 to the phase of each of the first drive signals G2 and G3 is defined as the phase difference θ.

Here, when all the first drive signals G1 and G4 and the second drive signals G6 and G7 are "ON," the third state is achieved where the primary coil L1 is electrically connected without the adjustment capacitor C1 between the output points 213 and 214 in the pair in the variable capacitance circuit 22. Alternatively, when all the first drive signals G2 and G3 and the second drive signals G5 and G8 are "ON," the second state is achieved where the primary coil L1 is electrically connected without the adjustment capacitor C1 between the output points 213 and 214 in the pair in the variable capacitance circuit 22. That is, in the present embodiment, a phase difference for a combination of the first drive signals and the second drive signals which produces a state where the primary coil L1 is electrically connected without the adjustment capacitor C1 between the output points 213 and 214 in the pair is defined as the phase difference θ.

<Leading Phase Mode and Lagging Phase Mode>

Next, a leading phase mode and a lagging phase mode will be described.

(1) Without Variable Capacitance Circuit

First, similarly to item "Basic Operation," the case where the variable capacitance circuit 22 is not provided, that is, only the primary coil L1 and the pair of primary capacitors C11 and C12 are electrically connected between the output points 213 and 214 in the pair will be described.

In this case, the inverter circuit 21 operates in an operation mode which is either the lagging phase mode or the leading phase mode depending on, for example, the relationship between the operation frequency of the inverter circuit 21 and the resonance frequency of the primary resonance circuit.

The leading phase mode is a mode in which the inverter circuit 21 operates with the phase of the output current (current flowing through the primary coil L1) of the inverter circuit 21 leading the phase of the output voltage of the inverter circuit 21. That is, in the leading phase mode, the current phase leads (becomes a leading phase of) the voltage phase. In the leading phase mode, the switching operation of the inverter circuit 21 is hard switching. Thus, in the leading phase mode, the switching loss of the conversion switching elements Q1 to Q4 is likely to increase and stress is likely to be applied to the conversion switching elements Q1 to Q4.

On the other hand, the lagging phase mode is a mode in which the inverter circuit 21 operates with the phase of the output current (current flowing through the primary coil L1) of the inverter circuit 21 lagging the phase of the output voltage of the inverter circuit 21. That is, in the lagging phase mode, the current phase lags behind (becomes a lagging phase of) the voltage phase. In the lagging phase mode, the switching operation of the inverter circuit 21 is soft switching. Thus, in the lagging phase mode, the switching loss of the conversion switching elements Q1 to Q4 can be reduced, and stress is less likely to be applied to the conversion switching elements Q1 to Q4. Thus, the operation of the inverter circuit 21 in the lagging phase mode is preferable to the operation of the inverter circuit 21 in the leading phase mode.

(2) With Variable Capacitance Circuit

Next, the case where the variable capacitance circuit 22 is provided, that is, the primary coil L1, the pair of primary capacitors C11 and C12, and the variable capacitance circuit 22 are electrically connected between the output points 213 and 214 in the pair will be described.

In this case, similarly to the inverter circuit 21, the variable capacitance circuit 22 also operates in an operation mode which is either the leading phase mode or the lagging phase mode. Also in the variable capacitance circuit 22, operation in the lagging phase mode but not in the leading phase mode is preferable.

It is confirmed that when the variable capacitance circuit 22 is provided, the operation mode (lagging phase mode or leading phase mode) of each of the inverter circuit 21 and the variable capacitance circuit 22 changes depending on the phase difference θ between each of the first drive signals G1 to G4 and each of the second drive signals G5 to G8. Moreover, the relationship between the operation mode of the inverter circuit 21 and the phase difference θ changes depending on the operation mode (initial mode) of the inverter circuit 21 in a state where the variable capacitance circuit 22 is not provided, that is, under the condition described in "(1) Without Variable Capacitance Circuit." In other words, the relationship between the operation frequency of the inverter circuit 21 and the resonance frequency of the primary resonance circuit determines the initial mode, which is the operation mode of the inverter circuit 21, and the relationship between the operation mode of the inverter circuit 21 and the phase difference θ changes depending on whether the initial mode of the inverter circuit 21 is the lagging phase mode or the leading phase mode.

Figure 5A:
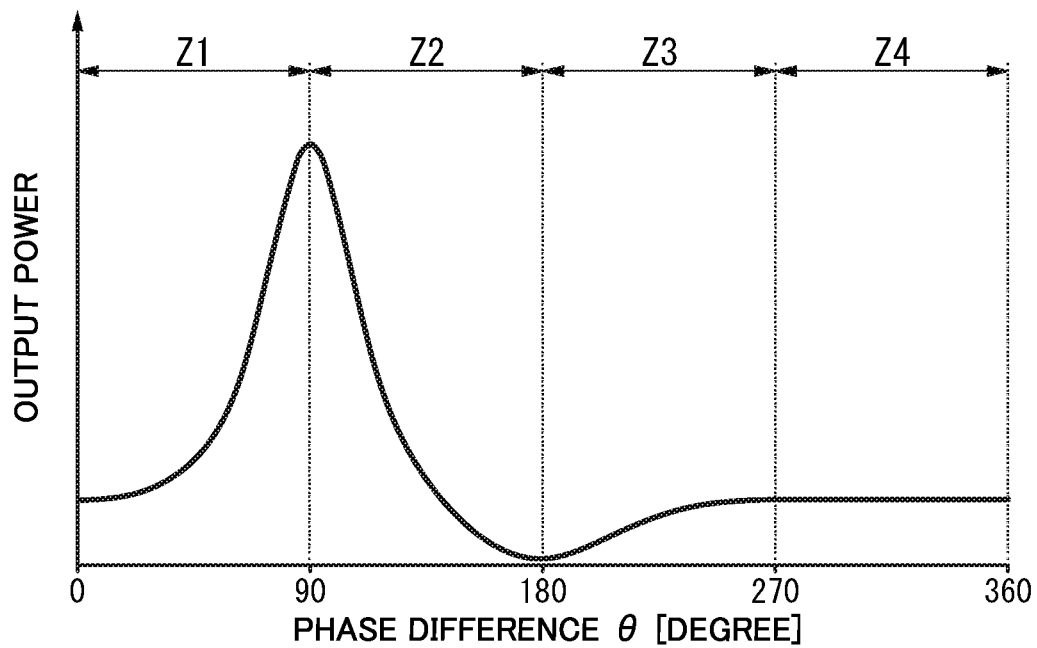
FIG. 5A is a graph illustrating an example of phase difference characteristics in the case of an initial leading phase of the non-contact power supply apparatus.
Figure 5B:
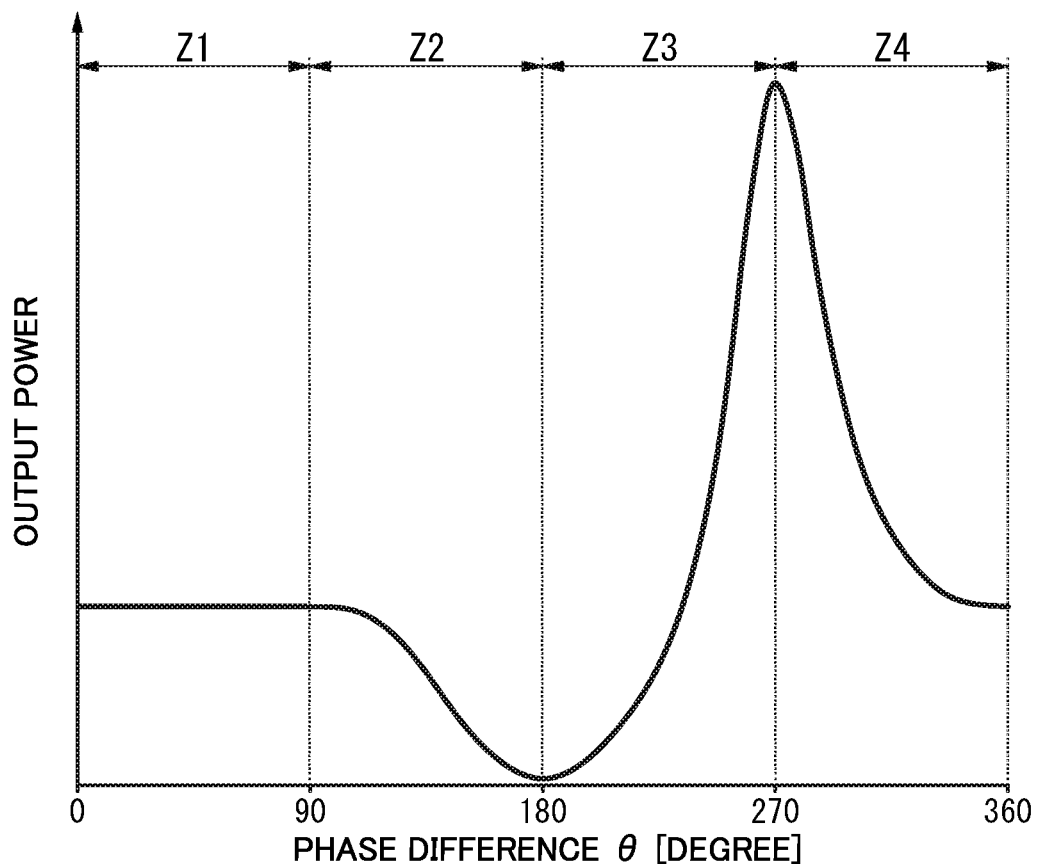
FIG. 5B is a graph illustrating an example of phase difference characteristics in the case of an initial lagging phase of the non-contact power supply apparatus.

FIGS. 5A and 5B show the characteristics (phase difference characteristics) of the output power of the non-contact power supply apparatus 2 with respect to the phase difference θ respectively in the case where the inverter circuit 21 is in the leading phase mode without the variable capacitance circuit 22 and in the case where the inverter circuit 21 is in the lagging phase mode without the variable capacitance circuit 22. That is, FIG. 5A shows the characteristic of the output power with respect to the phase difference θ in the case of the initial mode being the leading phase mode, and FIG. 5B shows the characteristic of the output power with respect to the phase difference θ in the case of the initial mode is the lagging phase mode. In FIGS. 5A and 5B, the horizontal axis represents the phase difference θ between each of the first drive signals G1 to G4 and each of the second drive signals G5 to G8, and the vertical axis represents the output power of the non-contact power supply apparatus 2.

That is, when the inverter circuit 21 is in the leading phase mode without the variable capacitance circuit 22, that is, when the initial mode is the leading phase mode (hereinafter referred to as an "initial leading phase"), the output power of the non-contact power supply apparatus 2 changes, for example, depending on the phase difference θ as shown in FIG. 5A. In the example shown in FIG. 5A, the output power of the non-contact power supply apparatus 2 changes depending on the phase difference so as to be local maximum and maximum when the phase difference θ is 90 degrees and so as to be local minimum and minimum when the phase difference θ is 180 degrees. The principle of changing of the output power of the non-contact power supply apparatus 2 depending on the phase difference θ will be described in item "(2) Principle of Output Power Control by Phase Difference Control" below. Here, the phase difference θ (0 degrees to 360 degrees) is divided into four zones, that is, a first zone Z1 extending from 0 degrees to 90 degrees, a second zone Z2 extending from 90 degrees to 180 degrees, a third zone Z3 extending from 180 degrees to 270 degrees, and a fourth zone Z4 extending from 270 degrees to 360 degrees. In this case, in the "initial leading phase" in which the initial mode is the leading phase mode, the relationship between the operation mode (lagging phase mode or leading phase mode) of the inverter circuit 21 and each zone of the phase difference θ is shown in Table 1.

TABLE 1

|  | Z1 (0-90) | Z2 (90-180) | Z3 (180-270) | Z4 (270-360) |
| --- | --- | --- | --- | --- |
| Inverter Circuit | Leading Phase Mode | Lagging Phase Mode | Leading Phase Mode | Leading Phase Mode |

In sum, in the case of "initial leading phase," the inverter circuit 21 operates in the lagging phase mode only in the second zone Z2 in which the phase difference θ is 90 degrees to 180 degrees of the first zone Z1 to fourth zone Z4.

On the other hand, when the inverter circuit 21 is in the lagging phase mode without the variable capacitance circuit 22, that is, when the initial mode is the lagging phase mode (hereinafter referred to as an "initial lagging phase"), the output power of the non-contact power supply apparatus 2 changes depending on, for example, the phase difference θ as illustrated in FIG. 5B. In the example shown in FIG. 5B, the output power of the non-contact power supply apparatus 2 changes depending on the phase difference θ so as to be local maximum and maximum when the phase difference θ is 270 degrees and so as to be local minimum and minimum when the phase difference θ is 180 degrees. In this case, in the "initial lagging phase" in which the initial mode is the lagging phase, the relationship between the operation mode (lagging phase mode or leading phase mode) of each of the inverter circuit 21 and the variable capacitance circuit 22 and each zone of the phase difference θ is shown in Table 2.

TABLE 2

|  | Z1 (0-90) | Z2 (90-180) | Z3 (180-270) | Z4 (270-360) |
|---|---|---|---|---|
| Inverter Circuit | Lagging Phase Mode | Lagging Phase Mode | Leading Phase Mode | Lagging Phase Mode |
| Variable Capacitance Circuit | Lagging Phase Mode | Leading Phase Mode | Lagging Phase Mode | Lagging Phase Mode |

In sum, in the case of the "initial lagging phase," the inverter circuit 21 operates in the lagging phase mode in three zones, the first zone Z1 and the second zone Z2 in which the phase difference θ is 0 degrees to 180 degrees and the fourth zone Z4 in which the phase difference θ is 270 degrees to 360 degrees of the first zone Z1 to the fourth zone Z4. Moreover, in the case of the "initial lagging phase," the variable capacitance circuit 22 operates in the lagging phase mode in three zones, the first zone Z1 in which the phase difference θ is 0 degrees to 90 degrees and the third zone Z3 and the fourth zone Z4 in which the phase difference θ is 180 degrees to 360 degrees of the first zone Z1 to the fourth zone Z4. That is, in the case of the "initial lagging phase," both the inverter circuit 21 and the variable capacitance circuit 22 operate in the lagging phase mode in two zones, the first zone Z1 in which the phase difference θ is 0 degrees to 90 degrees and the fourth zone Z4 in which the phase difference θ is 270 degrees to 360 degrees of the first zone Z1 to the fourth zone Z4.

<Output Power Control>

Next, operation of "output power control" of adjusting the magnitude of an output power in the non-contact power supply apparatus 2 of the present embodiment will be described.

(1) Frequency Control and Phase Difference Control

In the present embodiment, the controller 233 of the control circuit 23 is configured to adjust the magnitude of the output power by two methods, "frequency control" for controlling the frequencies of the first drive signals G1 to G4 and the second drive signals G5 to G8 and "phase difference control" for adjusting the phase difference θ.

In the present embodiment, the controller 233 of the control circuit 23 first adjusts the phase difference θ to perform the phase difference control of adjusting the magnitude of the output power.

In the phase difference control, the controller 233 adjusts the phase difference θ, which is a delay of the phase of each of the second drive signals G6 and G7 (G5, G8) to the phase of each of the first drive signals G1 and G4 (G2, G3), to a set value within a prescribed range so as to adjust the magnitude of the output power of the non-contact power supply apparatus 2. Here, the prescribed range is set to a default range at the start of the phase difference control, and after the start of the phase difference control, the prescribed range is set by the setter 232 in accordance with the initial mode estimated by the estimator 231. Here, the control circuit 23 estimates whether the initial mode (the operation mode of the inverter circuit 21 in the case of the variable capacitance circuit 22 being disabled) is the leading phase mode or the lagging phase mode while the variable capacitance circuit 22 is in operation by the controller 233. That is, the estimator 231 estimates the initial mode while the variable capacitance circuit 22 is in operation by the second drive signals G5 to G8 from the controller 233 without actually disabling the variable capacitance circuit 22. A method for estimating the initial mode by the estimator 231 will be described in detail in "Estimation of Initial Mode" below.

In the present embodiment, as an example, a default prescribed range (at the start of the phase difference control) is a range of 90 degrees to 180 degrees. Moreover, the phase difference θ at the start time of the phase difference control, that is, the initial value of the phase difference θ is a value within the default prescribed range and is, for example, 180 degrees in the present embodiment.

In sum, after the start of the phase difference control, the controller 233 first adjusts the phase difference θ within the default prescribed range (of 90 degrees to 180 degrees in this embodiment) so as to adjust the magnitude of the output power of the non-contact power supply apparatus 2.

That is, as can be clearly seen from FIGS. 5A and 5B, the output power of the non-contact power supply apparatus 2 changes depending on the phase difference θ, and therefore, adjusting the phase difference θ to the set value by the controller 233 enables adjustment of the magnitude of the output power. Note that the phase difference θ between each of the first drive signals G1 to G4 and each of the second drive signals G5 to G8, as described above, also affects the operation mode (lagging phase mode or leading phase mode) of each of the inverter circuit 21. Moreover, depending on whether the initial mode which is the operation mode of the inverter circuit 21 in the case of the variable capacitance circuit 22 being disabled is the lagging phase mode or the leading phase mode, the relationship between the operation mode of the inverter circuit 21 and the phase difference θ changes. Thus, to operate the inverter circuit 21 in the lagging phase mode, a range within which the phase difference θ is adjustable (the prescribed range) has to be automatically set in accordance with the initial mode.

Thus, in the non-contact power supply apparatus 2 of the present embodiment, as described above, after the start of the phase difference control, the prescribed range is set by the setter 232 in accordance with the initial mode estimated by the estimator 231. That is, in the phase difference control, the prescribed range is not invariable, but varies in accordance with the initial mode (the operation mode of the inverter circuit 21 in the case of the variable capacitance circuit 22 being disabled). In other words, the setter 232 actively sets the prescribed range in accordance with the result of the estimation by the estimator 231. This will be descried in detail below.

First, with reference to FIG. 5A, the case where the initial mode estimated by the estimator 231 is the leading phase mode, that is, the case of "initial leading phase" will be described. In this case, as described above, the inverter circuit 21 operates in the lagging phase mode only in the second zone Z2 in which the phase difference θ is 90 degrees to 180 degrees of the first zone Z1 to the fourth zone Z4. Thus, in the present embodiment, the setter 232 is configured to set the prescribed range to the range of 90 degrees to 180 degrees when the initial mode estimated by the estimator 231 is the leading phase mode (i.e., in the case of the "initial leading phase"). In the present embodiment, the default prescribed range (at the start of the phase difference control) is the range of 90 degrees to 180 degrees, and therefore, if the initial mode estimated by the estimator 231 is the leading phase mode, the setter 232 leaves the default prescribed range as it is. Thus, the inverter circuit 21 can operate in the lagging phase mode when the control circuit 23 adjusts the phase difference θ to the set value within the prescribed range to adjust the magnitude of the output power of the non-contact power supply apparatus 2.

Next, with reference to FIG. 5B, the case of the initial mode estimated by the estimator 231 being the lagging phase mode, that is, the case of "initial lagging phase" will be described. In this case, as described above, the inverter circuit 21 operates in the lagging phase mode in three zones, the first zone Z1, the second zone Z2, and the fourth zone Z4. Note that in the first zone Z1 in which the phase difference θ is 0 degrees to 90 degrees, the magnitude of the output power only slightly changes even when the phase difference θ changes. Thus, in order to adjust the magnitude of the output power by adjusting the phase difference θ, the phase difference θ has to be adjusted in two zones, the second zone Z2 in which the phase difference θ is 90 degrees to 180 degrees and the fourth zone Z4 in which the phase difference θ is 270 degrees to 360 degrees. Thus, in the present embodiment, the setter 232 is configured to set the prescribed range to a range including both a range of 90 degrees to 180 degrees and a range of 270 degrees to 360 degrees when the initial mode estimated by the estimator 231 is the lagging phase mode (i.e., in the case of the "initial lagging phase"). In the present embodiment, the default prescribed range (at the start of the phase difference control) is the range of 90 degrees to 180 degrees, and therefore, if the initial mode estimated by the estimator 231 is the lagging phase mode, the setter 232 expands the prescribed range from the default prescribed range. For example, when the prescribed range is the range of 270 degrees to 360 degrees and the range of 90 degrees to 180 degrees, the inverter circuit 21 is operable in the lagging phase mode when the control circuit 23 adjusts the phase difference θ to the set value within the prescribed range to adjust the magnitude of the output power of the non-contact power supply apparatus 2.

Moreover, as illustrated in FIGS. 5A and 5B, the output power increases as the phase difference θ decreases whether the initial mode is the "initial leading phase" or the "initial lagging phase," in zones in which the inverter circuit 21 operates in the lagging phase mode (at least one of the second zone Z2 and the fourth zone Z4). Thus, in the present embodiment, for example, when the prescribed range is the second zone (90 degrees to 180 degrees) Z2, the control circuit 23 gradually reduces the set value within the prescribed range so that the phase difference θ is gradually reduced from the upper limit value (180 degrees) toward the lower limit value (90 degrees) within the prescribed range. Similarly, when the prescribed range is the fourth zone (270 degrees to 360 degrees) Z4, the control circuit 23 preferably gradually reduces the set value within the prescribed range so that the phase difference θ is gradually reduced from the upper limit value (360 degrees) toward the lower limit value (270 degrees) within the prescribed range. Thus, as the control circuit 23 gradually changes (reduces) the set value within the prescribed range, the output power of the non-contact power supply apparatus 2 gradually increases.

Here, in the present embodiment, in the case of the "initial lagging phase," the control circuit 23 may alternatively select a first process of adjusting the phase difference θ within the range of 90 degrees to 180 degrees and a second process of adjusting the phase difference θ within the range of 270 degrees to 360 degrees. Here, the control circuit 23 is configured to transition to the second process when the magnitude of the output power after the first process is less than a prescribed target value. In sum, in the case of the "initial lagging phase," the controller 233 first selects the first process to adjust the phase difference θ within the range of 90 degrees to 180 degrees of the prescribed range. Then, when the magnitude of the output current after the first process does not reach the target value, the controller 233 selects the second process to adjust the phase difference θ within the range of 270 degrees to 360 degrees of the prescribed range. In other words, in the case of the "initial lagging phase," the prescribed range is set to a range including both the range of 90 degrees to 180 degrees and the range of 270 degrees to 360 degrees, but the controller 233 adjusts the phase difference θ within the range of 270 degrees to 360 degrees only when the output current after the first process does not reach the target value.

Here, the control circuit 23 is configured to gradually reduce the phase difference θ from 90 degrees toward 0 degrees when transitioning from the first process to the second process. That is, when the initial mode estimated by the estimator 231 is the lagging phase mode (i.e., in the case of the "initial lagging phase"), as described above, the inverter circuit 21 operates in the lagging phase mode also in the first zone Z1 in which the phase difference θ is within a range of 0 degrees to 90 degrees. Thus, in the present embodiment, in the case of the "initial lagging phase," the setter 232 adds the range of 0 degrees to 90 degrees to the prescribed range so that the prescribed range includes a range of 0 degrees to 180 degrees and the range of 270 degrees to 360 degrees. Since 0 degrees is equal to 360 degrees in terms of the phase difference θ, a phase difference θ of 0 degrees means the same as a phase difference θ of 360 degrees. Thus, the prescribed range including the range of 0 degrees to 180 degrees and the range of 270 degrees to 360 degrees may be deemed to be a continuous range of 270 degrees to 180 degrees, where the upper limit value is 180 degrees and the lower limit value is 270 degrees.

Specifically, the controller 233 first gradually reduces the phase difference θ from 180 degrees which is the upper limit value of the prescribed range toward 90 degrees in the first process. When the magnitude of an output power reaches a target value during this process, the controller 233 fixes the phase difference θ to a value at the time when the magnitude of the output power reaches the target value, and the controller 233 terminates the phase difference control. On the other hand, when the output power does not reach the target value in the first process, the controller 233 gradually reduces the phase difference θ from 90 degrees toward 0 degrees. During this process, the phase difference θ changes, but the magnitude of the output current does not substantially change. Then, when the phase difference θ reaches 0 degrees (=360 degrees), the controller 233 gradually reduces the phase difference θ from 360 degrees (0 degrees) toward 270 degrees which is the lower limit value of the prescribed range in the second process. When the magnitude of the output current reaches the target value during this process, the controller 233 fixes the phase difference θ to a value at the time when the magnitude of the output current reaches the target value, and the controller 233 terminates the phase difference control. Thus, in the present embodiment, the control circuit 23 does not instantaneously switches the phase difference θ from 90 degrees to 0 degrees (=360 degrees) when transitioning from the first process to the second process, but the control circuit 23 continuously changes the phase difference θ from 90 degrees to 0 degrees (=360 degrees).

Note that in the case of the "initial lagging phase," not only the inverter circuit 21 but also the variable capacitance circuit 22 operates in the lagging phase mode in two zones, the first zone Z1 in which the phase difference θ is 0 degrees to 90 degrees and in the fourth zone Z4 in which the phase difference θ is 270 degrees to 360 degrees. As described above, in the first zone Z1, the magnitude of the output power does not substantially change although the phase difference θ changes. Thus, adjusting the phase difference θ enables adjustment of the magnitude of the output power only in the fourth zone Z4 of the two zones, the first zone Z1 and the fourth zone Z4. Thus, in the case of the "initial lagging phase," a final phase difference θ after the output power is adjusted by the phase difference control is preferably within the range of 270 degrees to 360 degrees. Thus, both the inverter circuit 21 and the variable capacitance circuit 22 can operate in the lagging phase mode when the control circuit 23 adjusts the phase difference θ to the set value within the prescribed range to adjust the magnitude of the output power of the non-contact power supply apparatus 2.

When the magnitude of the output power after adjustment by the phase difference control is smaller than the prescribed target value, the controller 233 of the control circuit 23 performs the frequency control described below. That is, when only the frequency control results in the output power smaller than the target value, the controller 233 compensates for the shortfall by the phase difference control.

In the frequency control, the controller 233 adjusts the frequencies of the first drive signals G1 to G4 and the second drive signals G5 to G8 to adjust the magnitude of the output power. That is, as described in item "(1) Without Variable Capacitance Circuit" in "Basic Operation," the magnitude of the output power output from the primary coil L1 changes depending on the operation frequency of the inverter circuit 21 (i.e., the frequencies of the first drive signals G1 to G4) (see FIG. 3). Thus, in the frequency control, the controller 233 of the control circuit 23 adjusts the frequencies of the first drive signals G1 to G4 and the second drive signals G5 to G8 to adjust the operation frequency of the inverter circuit 21 and to adjust the magnitude of the output voltage.

Here, when the frequency band (allowed frequency band F1) usable as the operation frequency of the inverter circuit 21 is limited, frequencies adjustable by the frequency control are limited within the allowed frequency band F1. Note that in the present embodiment, the value of the phase difference θ in the frequency control is the same as the value of the phase difference θ after adjustment by the phase difference control. In sum, while the frequency control is performed, the controller 233 fixes the phase difference θ to the final phase difference θ (90 degrees in the case of the "initial leading phase" and 270 degrees in the "initial lagging phase") after the adjustment by the phase difference control.

(2) Principle of Output Power Control by Phase Difference Control

With reference to FIGS. 6A to 8, the principle that the control circuit 23 adjusts the phase difference θ to a set value within a prescribed range by phase difference control to control the magnitude of the output power of the non-contact power supply apparatus 2 will be described below.

The output power of the non-contact power supply apparatus 2 changes depending on a voltage applied to the primary coil L1 of the primary resonance circuit. The voltage applied to the primary coil L1 is a composite voltage of the output voltage of the inverter circuit 21 and the voltage across the variable capacitance circuit 22 (voltage between the drain of the adjustment switching element Q5 and the drain of the adjustment switching element Q7). Thus, when the output voltage of the inverter circuit 21 and the voltage across the variable capacitance circuit 22 have the same polarity and enhance each other, the voltage applied to the primary coil L1 increases, so that the output power of the non-contact power supply apparatus 2 increases. In this case, as the voltage across the adjustment capacitor C1 increases, the voltage across the variable capacitance circuit 22 and the voltage applied to the primary coil L1 increase, and therefore, the output power of the non-contact power supply apparatus 2 increases. Thus, in the phase difference control, the control circuit 23 adjusts the phase difference θ to change the balance of charging and discharging of the adjustment capacitor C1 and to change the voltage across the adjustment capacitor C1, thereby changing the output power of the non-contact power supply apparatus 2.

Here, whether the adjustment capacitor C1 is charged or discharged is determined depending on on/off of the plurality of adjustment switching elements Q5 to Q8 and the orientation of the output current of the inverter circuit 21. The output current of the inverter circuit 21 is a current flowing through the primary coil L1 and is thus hereinafter also referred to as a "primary current I1." The orientation of the primary current I1 flowing from the first output point 213 through the primary capacitor C11, the variable capacitance circuit 22, the primary coil L1, and the primary capacitor C11 to the second output point 214, that is, the orientation of the primary current I1 indicated by the arrow in FIG. 1 is referred to as a "positive direction." The orientation of the primary current I1 flowing from the second output point 214 through the primary capacitor C12, the primary coil L1, the variable capacitance circuit 22, and the primary capacitor C11 to the first output point 213, that is, the orientation opposite to the orientation of the primary current I1 indicated by the arrow in FIG. 1 is referred to as a "negative direction."

FIGS. 6A to 6D show combination patterns of on/off of the plurality of adjustment switching elements Q5 to Q8 and directions of the primary current I1. In FIGS. 6A to 6D, solid arrows represent current paths, and the adjustment switching elements circled by a dotted line represent elements in an on state.

Figure 6A:
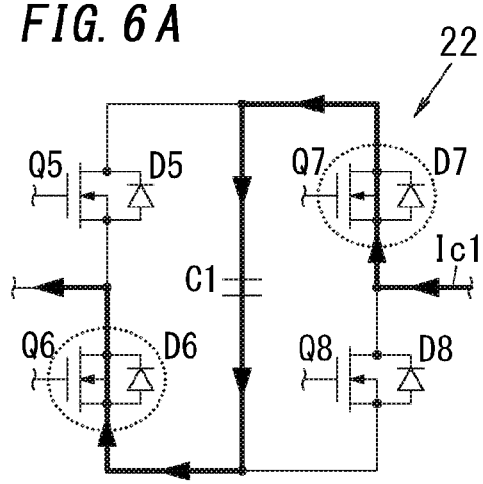
FIG. 6A is an explanatory view illustrating a first charge mode of a variable capacitance circuit in the non-contact power supply apparatus.
Figure 6B:
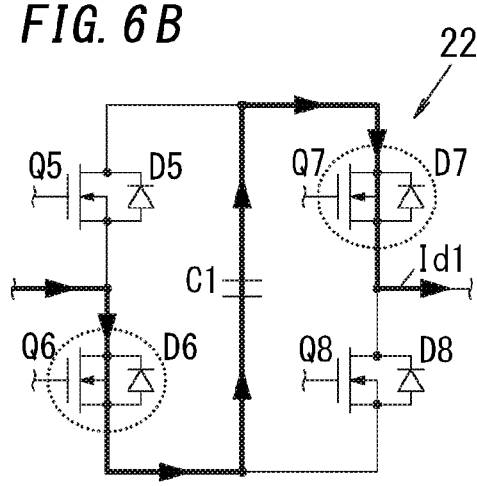
FIG. 6B is an explanatory view illustrating a first discharge mode of the variable capacitance circuit in the non-contact power supply apparatus.
Figure 6C:
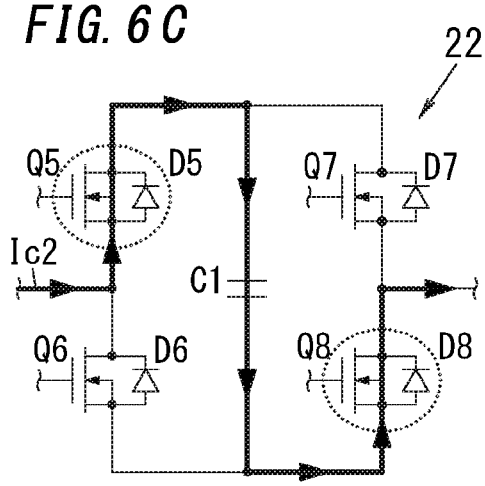
FIG. 6C is an explanatory view illustrating a second charge mode of the variable capacitance circuit in the non-contact power supply apparatus.
Figure 6D:
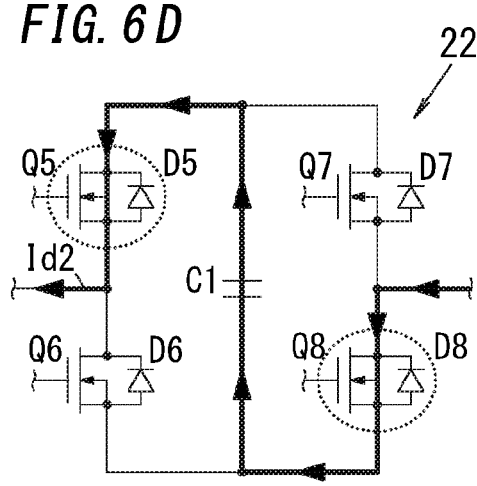
FIG. 6D is an explanatory view illustrating a second discharge mode of the variable capacitance circuit in the non-contact power supply apparatus.

FIG. 6A shows the variable capacitance circuit 22 in which the adjustment switching elements Q6 and Q7 are on, the adjustment switching elements Q5 and Q8 are off, and the primary current I1 in the negative direction flows (hereinafter referred to as a "first charge mode"). FIG. 6B shows the variable capacitance circuit 22 in which the adjustment switching elements Q6 and Q7 are on, the adjustment switching elements Q5 and Q8 are off, and the primary current I1 in the positive direction flows (hereinafter referred to as a "first discharge mode"). FIG. 6C shows the variable capacitance circuit 22 in which the adjustment switching elements Q5 and Q8 are on, the adjustment switching elements Q6 and Q7 are off, and the primary current I1 in the positive direction flows (hereinafter referred to as a "second charge mode"). FIG. 6D shows the variable capacitance circuit 22 in which the adjustment switching elements Q5 and Q8 are on, the adjustment switching elements Q6 and Q7 are off, and the primary current I1 in the negative direction flows (hereinafter referred to as a "second discharge mode"). In the first charge mode shown in FIG. 6A and the second charge mode shown in the FIG. 6C, the adjustment capacitor C1 is charged. On the other hand, in the first discharge mode shown in FIG. 6B and the second discharge mode shown in FIG. 6D, the adjustment capacitor C1 is discharged.

Figure 8:
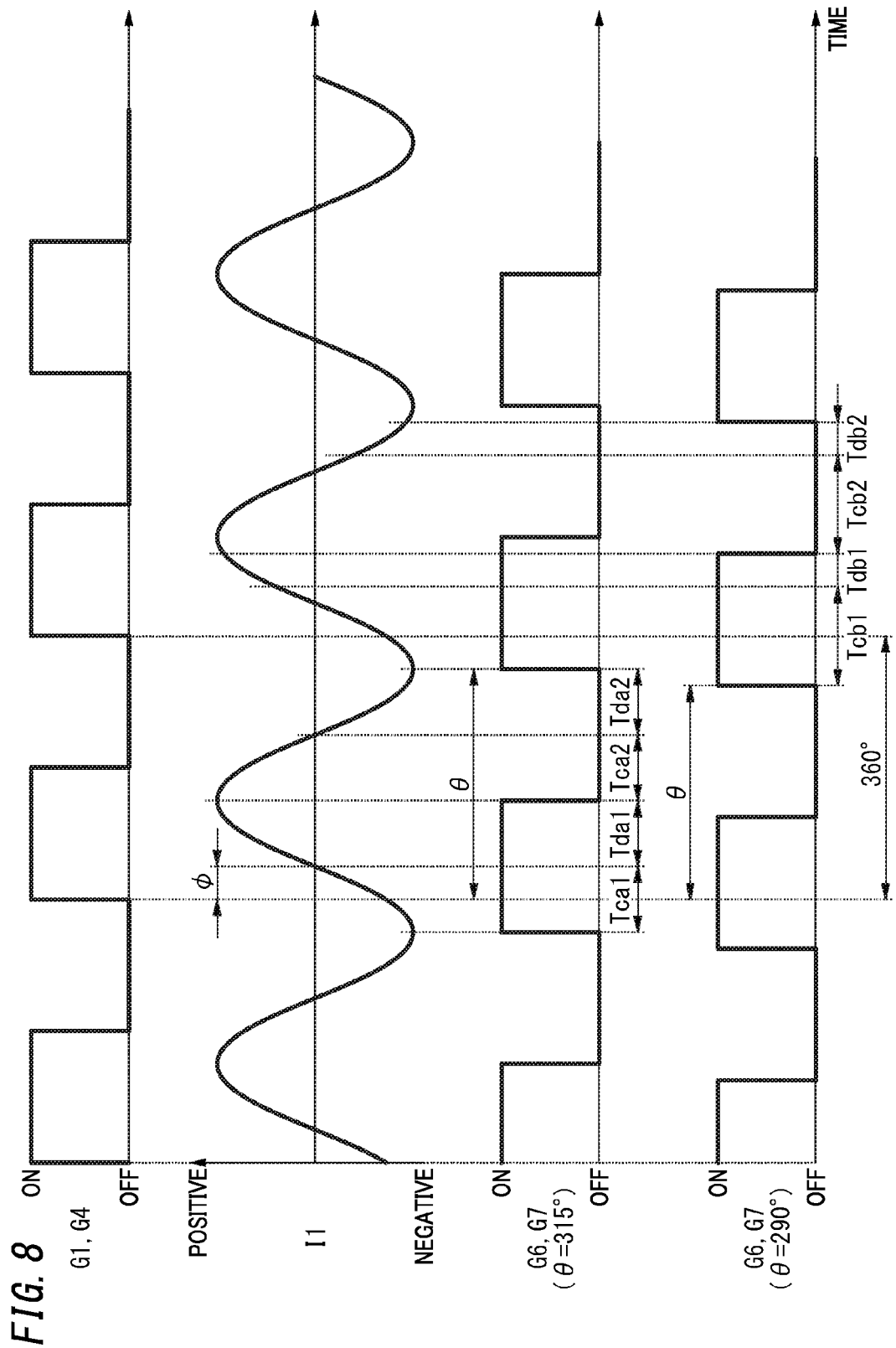
FIG. 8 is a waveform diagram illustrating the first drive signal, the primary current, and the second drive signal in the case where the V-I phase difference in the non-contact power supply apparatus is 45 degrees.

Next, with reference to FIGS. 7 and 8, the relationship between the phase difference θ and the balance of charging and discharging of the adjustment capacitor C1 will be described. Both in FIG. 7 and FIG. 8, the horizontal axis is a time axis, and waveforms of the first drive signals "G1, G4," the primary current "I1," and two types of the second drive signals "G6, G7" are shown sequentially from top to bottom. The two types of the second drive signals here are different in the phase differences θ. Note that "ON" and "OFF" in FIGS. 7 and 8 represent on and off of the corresponding switching elements (conversion switching elements and adjustment switching elements).

FIG. 7 shows an example in the case of the "initial lagging phase" and a delay (hereinafter referred to as a "voltage-current phase difference") Φ of the phase of the primary current I1 to the phase of the output voltage of the inverter circuit 21 being 90 degrees. In FIG. 7, as the waveforms of the two types of the second drive signals "G6, G7," a waveform when the phase difference θ is 360 degrees and a waveform when the phase difference θ is 320 degrees are shown sequentially from top to bottom. Moreover, in FIG. 7, in the case of the phase difference θ being 360 degrees, a period of the first charge mode is denoted by "Tca1," a period of the first discharge mode is denoted by "Tda1," a period of the second charge mode is denoted by "Tca2," and a period of the second discharge mode is denoted by "Tda2." Similarly, in the case of the phase difference θ being 320 degrees, a period of the first charge mode is denoted by "Tcb1," a period of the first discharge mode is denoted by "Tdb1," a period of the second charge mode is denoted by "Tcb2," and a period of the second discharge mode is denoted by "Tdb2."

As can be clearly seen from FIG. 7, when the phase difference θ is 360 degrees, substantial equilibrium is achieved between a time period for charging the adjustment capacitor C1 (hereinafter referred to as a "charging time period") and a time period for discharging the adjustment capacitor C1 (hereinafter referred to as a "discharging time period") in one cycle of the second drive signal. That is, when the phase difference θ is 360 degrees, the total of "Tca1" and "Tca2" is substantially the same length as the total of "Tda1" and "Tda2." On the other hand, when the phase difference θ is 320 degrees, in one cycle of the second drive signal, the charging time period exceeds the discharging time period. That is, when the phase difference θ is 320 degrees, the total of "Tcb1" and "Tcb2" is longer than the total of "Tdb1" and "Tdb2."

Thus, when the phase difference θ changes from the 360 degrees to approach 270 degrees, in one cycle of the second drive signal, the equilibrium between the charging time period and the discharging time period is disturbed, and the proportion of the charging time period gradually increases. As the charging time period increases with respect to the discharging time period, the voltage across the adjustment capacitor C1 increases. Thus, as a result, as the phase difference θ approaches from 360 degrees to 270 degrees, the output power of the non-contact power supply apparatus 2 gradually increases.

Moreover, FIG. 8 shows an example in the case of the "initial lagging phase" and the voltage-current phase difference Φ being 45 degrees. In FIG. 8, as the waveforms of the two types of the second drive signals "G6, G7," a waveform when the phase difference θ is 315 degrees and a waveform when the phase difference θ is 290 degrees are shown sequentially from top to bottom. Moreover, in FIG. 8, in the case of the phase difference θ being 315 degrees, a period of the first charge mode is denoted by "Tca1," a period of the first discharge mode is denoted by "Tda1," a period of the second charge mode is denoted by "Tca2," and a period of the second discharge mode is denoted by "Tda2." Similarly, in the case of the phase difference θ being 290 degrees, a period of the first charge mode is denoted by "Tcb1," a period of the first discharge mode is denoted by "Tdb1," a period of the second charge mode is denoted by "Tcb2," and a period of the second discharge mode is denoted by "Tdb2."

When the voltage-current phase difference Φ is 45 degrees, as can be clearly seen from FIG. 8, substantial equilibrium is achieved between the charging time period and the discharging time period in one cycle of the second drive signal even when the phase difference θ is 315 degrees. That is, even when the phase difference θ is 315 degrees, the total of "Tca1" and "Tca2" is substantially the same length as the total of "Tda1" and "Tda2." On the other hand, when the phase difference θ is 290 degrees, in one cycle of the second drive signal, the charging time period exceeds the discharging time period. That is, when the phase difference θ is 290 degrees, the total of "Tcb1" and "Tcb2" is longer than the total of "Tdb1" and "Tdb2."

Thus, not only in the case of the voltage-current phase difference Φ being 90 degrees but also in the case of the "initial lagging phase," when the phase difference θ changes from 360 degrees to approach 270 degrees, in one cycle of the second drive signal, the equilibrium between the charging time period and the discharging time period is disturbed, and the proportion of the charging time period gradually increases. Note that in the case of the voltage-current phase difference Φ being 90 degrees, the charging time period exceeds the discharging time period with the phase difference θ being 320 degrees, whereas in the case of the voltage-current phase difference Φ being 45 degrees, the equilibrium between the charging time period and the discharging time period is achieved even with the phase difference θ being 315 degrees. As described above, when the phase difference θ is gradually reduced from 360 degrees, a phase difference θ (hereinafter referred to as a "change start point") corresponding to an inflection point varies depending on the voltage-current phase difference Φ. The inflection point is a point at which the equilibrium between the charging time period and the discharging time period is disturbed, and the voltage across the adjustment capacitor C1 starts increasing. The change start point shifts toward 270 degrees when the voltage-current phase difference Φ is 45 degrees more than when the voltage-current phase difference Φ is 90 degrees, that is, the smaller the voltage-current phase difference Φ is, the more the change start point shifts toward 270 degrees.

That is, in the case of the "initial lagging phase," the change start point is located within the prescribed range (e.g., 270 degrees to 360 degrees), notwithstanding variations depending on the voltage-current phase difference Φ. Thus, when the control circuit 23 gradually reduces the phase difference θ from the upper limit value (360 degrees) of the prescribed range toward the lower limit value (270 degrees) of the prescribed range, the output power of the non-contact power supply apparatus 2 gradually increases after the phase difference θ reaches the change start point.

Moreover, in FIGS. 7 and 8, the case of the "initial lagging phase" has been described, but the case of the "initial leading phase" is equivalent to the case where the phase of the primary current I1 is shifted by 180 degrees with reference to the example of the "initial lagging phase." That is, shifting the phase of the primary current I1 by 180 degrees in the example shown in FIGS. 7 and 8 results in an example of the "initial leading phase." Thus, also in the case of the "initial leading phase," the change start point is located within the prescribed range (180 degrees to 90 degrees), notwithstanding variations depending on the voltage-current phase difference Φ. Thus, when the control circuit 23 gradually reduces the phase difference θ from the upper limit value (180 degrees) of the prescribed range toward the lower limit value (90 degrees) of the prescribed range, the output power of the non-contact power supply apparatus 2 gradually increases after the phase difference θ reaches the change start point.

According to the above-described principle, in both of the cases of the "initial lagging phase" and the "initial leading phase," the control circuit 23 adjusts the phase difference θ to the set value within the prescribed range by the phase difference control to adjust the magnitude of the output power of the non-contact power supply apparatus 2.

(3) Overall Flow of Output Power Control

Figure 9:
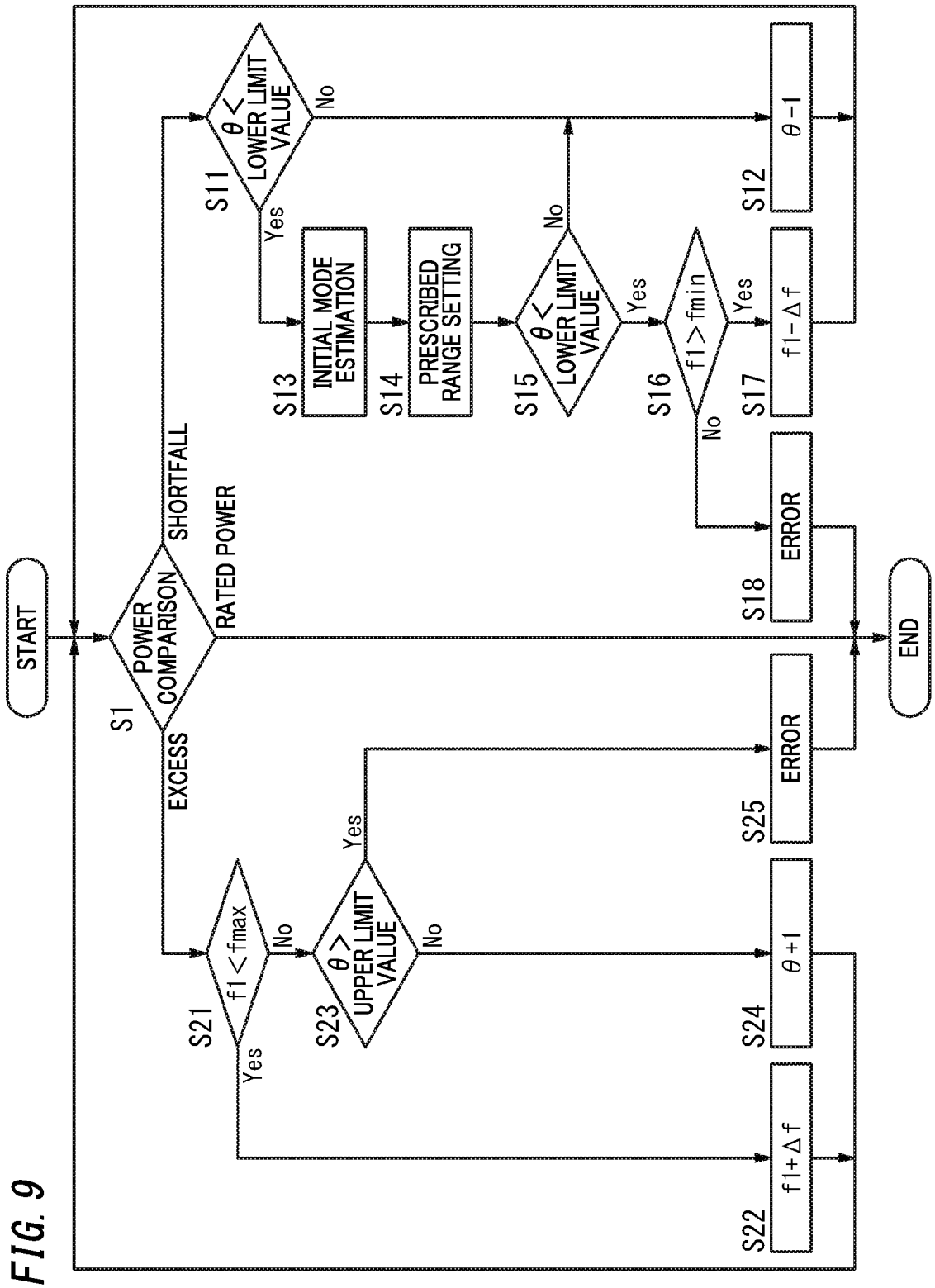
FIG. 9 is a flowchart illustrating output power control in the non-contact power supply apparatus.

With reference to the flowchart shown in FIG. 9 illustrating processes in the control circuit 23, an overall flow of the "output power control" of the present embodiment will be described below.

When the output power control is started, the control circuit 23 first compares the prescribed target value with the magnitude of the output power (S1). If the output power is within an allowable error range (±several percents) of the target value (S1: rated power), the output power control is terminated.

If the output power is lower than the lower limit of the allowable error range of the target value (S1: shortfall), the control circuit 23 first adjusts the output power by phase difference control. Specifically, the control circuit 23 compares the phase difference θ with the lower limit value of the prescribed range (S11). Here, if the prescribed range is a range of 270 degrees to 360 degrees, the initial value of the phase difference θ is 360 (degrees), and the lower limit value of the prescribed range is 270 (degrees). If the prescribed range is a range of 90 degrees to 180 degrees, the initial value of the phase difference θ is 180 (degrees), and the lower limit value of the prescribed range is 90 (degrees). In the present embodiment, the default prescribed range is 90 degrees to 180 degrees, and therefore, directly after the phase difference control is started, the initial value of the phase difference θ is 180 (degrees) and the lower range of the prescribed range is 90 (degrees). If the phase difference θ is greater than or equal to the lower limit value (S11: No), the control circuit 23 decrements (θ−1) the phase difference θ (S12) and returns to the operation in process S1. The control circuit 23 repeats these processes (S11 and S12) to gradually reduce the phase difference θ, thereby enabling a gradual increase in the output power, that is, approximation of the output power to the target value.

In contrast, if in the phase difference control, the phase difference θ becomes lower than the lower limit value (S11: Yes), the control circuit 23 estimates an initial mode by the estimator 231 (S13), and in accordance with the initial mode which has been estimated, the setter 232 sets the prescribed range (S14). Then, the control circuit 23 compares the phase difference θ with the lower limit value of the prescribed range which has been newly set (S15). For example, directly after the phase difference control is started, and in a condition in which the default prescribed range is set, if the initial mode estimated by the estimator 231 is the lagging phase mode, the setter 232 extends the prescribed range from the default range. In this case, the (extended) prescribed range which has been newly set is a range of 270 degrees to 180 degrees (0 degrees to 180 degrees and 270 degrees to 360 degrees), where the upper limit value is 180 degrees and the lower limit value is 270 degrees. If the phase difference θ is more than or equal to the lower limit value (S15: No), the control circuit 23 transitions to the operation in the process S12, decrements (θ−1) the phase difference θ (S12), and returns to the operation in the process S1. Thereafter, repetition of the processes S11 and S12 enables the control circuit 23 to gradually reduce the phase difference θ and to gradually increase the output power, i.e., to cause the output power to approximate to the target value.

In a result of the comparison between the phase difference θ and the lower limit value of the prescribed range which has been newly set, if the phase difference θ is less than the lower limit value (S15: Yes), the control circuit 23 then adjusts the output power by the frequency control. Specifically, the control circuit 23 compares an operation frequency (i.e., frequencies of the first drive signals G1 to G4) f1 of the inverter with the lower limit value fmin of the allowed frequency band F1 (S16). If the operation frequency f1 is higher than the lower limit value fmin (S16: Yes), the control circuit 23 reduces the operation frequency f1 of the inverter by a predetermined value Δf (S17) and returns to the operation of the process S1. Repetition of these processes (S16 and S17) enables the control circuit 23 to gradually reduce the operation frequency f1 and to gradually increase the output power, i.e., to cause the output power to approximate to the target value. Note that the initial value of the operation frequency f1 is, for example, the upper limit value fmax of the allowed frequency band F1.

Note that in the frequency control, if the operation frequency f1 becomes lower than or equal to the lower limit value fmin (S16: No), the control circuit 23 determines an error (S18) and terminates the output power control.

If the output power exceeds the upper limit of the allowable error range of the target value (S1: excess), the control circuit 23 first adjusts the output power by the frequency control. Specifically, the control circuit 23 compares the operation frequency (i.e., frequencies of the first drive signals G1 to G4) f1 of the inverter with the upper limit value fmax of the allowed frequency band F1 (S21). If the operation frequency f1 is lower than the upper limit value fmax (S21: Yes), the control circuit 23 increases the operation frequency f1 of the inverter by a prescribed value Δf (S22) and returns to the operation in the process S1. Repetition of these processes (S21 and S22) enables the control circuit 23 to gradually increase the operation frequency f1 and to gradually reduce the output power, i.e., to cause the output power to approximate to the target value.

If in the frequency control, the operation frequency f1 becomes higher than or equal to the upper limit range fmax (S21: No), the control circuit 23 then adjusts the output power by the phase difference control. Specifically, the control circuit 23 compares the phase difference θ with the upper limit value of the prescribed range (S23). Here, when the prescribed range is a range of 270 degrees to 360 degrees, the upper limit value of the prescribed range is 360 (degrees), and when the prescribed range is a range of 90 degrees to 180 degrees, the upper limit value of the prescribed range is 180 (degrees). If the phase difference θ is less than or equal to the upper limit value (S23: No), the control circuit 23 increments (θ+1) the phase difference θ (S24) and returns to the operation in process S1. The control circuit 23 repeats these processes (S23 and S24) to gradually increase the phase difference θ, thereby enabling a gradual reduction in the output power, that is, approximation of the output power to the target value.

Note that if the phase difference θ is greater than the upper limit value in the phase difference control (S23: Yes), the control circuit 23 determines an error (S25) and terminates the output power control.

Moreover, for the non-contact power supply apparatus 2, it is not essential that when the control circuit 23 adjusts the output power by the phase difference control, the upper limit value of the prescribed range is defined as an initial value, and the phase difference θ is gradually reduced from the initial value (the upper limit value of the prescribed range). For example, in the case where the prescribed range is a range of 270 degrees to 360 degrees, a value (e.g., 370 degrees) exceeding the upper limit value of the prescribed range may be defined as an initial value, and the control circuit 23 may gradually reduce the phase difference θ from the initial value. Alternatively, in the case where the prescribed range is a range of 270 degrees to 360 degrees, a value (e.g., 315 degrees) smaller than the upper limit value of the prescribed range may be defined as an initial value, and the control circuit 23 may gradually reduce the phase difference θ from the initial value. In both of the cases, in an area between the change start point located within the prescribed range and the lower limit value of the prescribed range, the output power of the non-contact power supply apparatus 2 changes depending on the change of the phase difference θ.

<Estimation of Initial Mode>

Next, a method for estimating an initial mode by the estimator 231 will be described. Here, two methods for estimation will be described.

In a first method for estimating the initial mode, the estimator 231 estimates the initial mode on the basis of the difference between the voltage phase and the current phase of the inverter circuit 21 (voltage-current phase difference). That is, the estimator 231 estimates the initial mode from the voltage-current phase difference with is a phase difference between the phase (current phase) of the output current (current flowing thorough the primary coil L1) of the inverter circuit 21 and the phase (voltage phase) of the output voltage of the inverter circuit 21. Here, the voltage-current phase difference is a delay of the current phase to the voltage phase.

Figure 10:
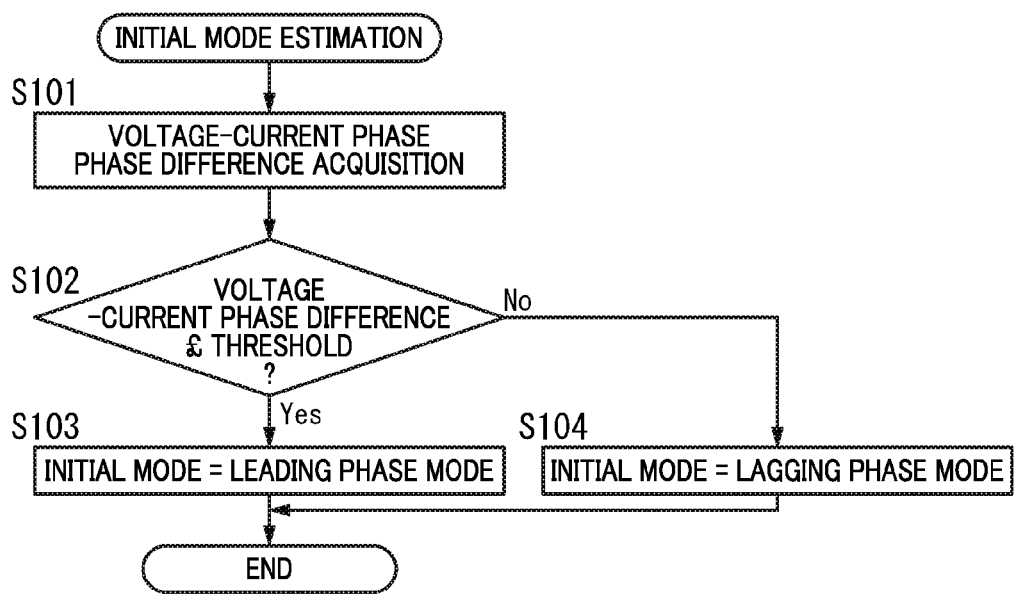
FIG. 10 is a flowchart illustrating a first method for estimating an initial mode in the non-contact power supply apparatus.

Specifically, the estimator 231 operates, for example, in accordance with a flowchart as shown in FIG. 10 to estimate whether the initial mode is the leading phase mode or lagging phase mode. In the example shown in FIG. 10, the estimator 231 calculates the phase difference between the output voltage and the output current of the inverter circuit 21 when the phase difference θ is changed within a range of 90 degrees to 180 degrees, and the estimator 231 acquires the voltage-current phase difference (S101). Here, the estimator 231 acquires the voltage-current phase difference preferably at a timing at which the phase difference θ is in the vicinity of the lower limit (90 degrees) of the default prescribed range. For example, when the phase difference θ is within a range of 100 degrees to 90 degrees, the estimator 231 acquires the voltage-current phase difference.

Then, the estimator 231 compares the voltage-current phase difference which has been acquired and a prescribed threshold (first threshold) (S102). If the voltage-current phase difference is less than or equal to the first threshold (S102: Yes), the estimator 231 estimates that the initial mode is the leading phase mode, that is, the "initial leading phase" (S103). In contrast, if the voltage-current phase difference is greater than the first threshold (S102: No), the estimator 231 estimates that the initial mode is the lagging phase mode, that is, the "initial lagging phase" (S104).

Figure 11:
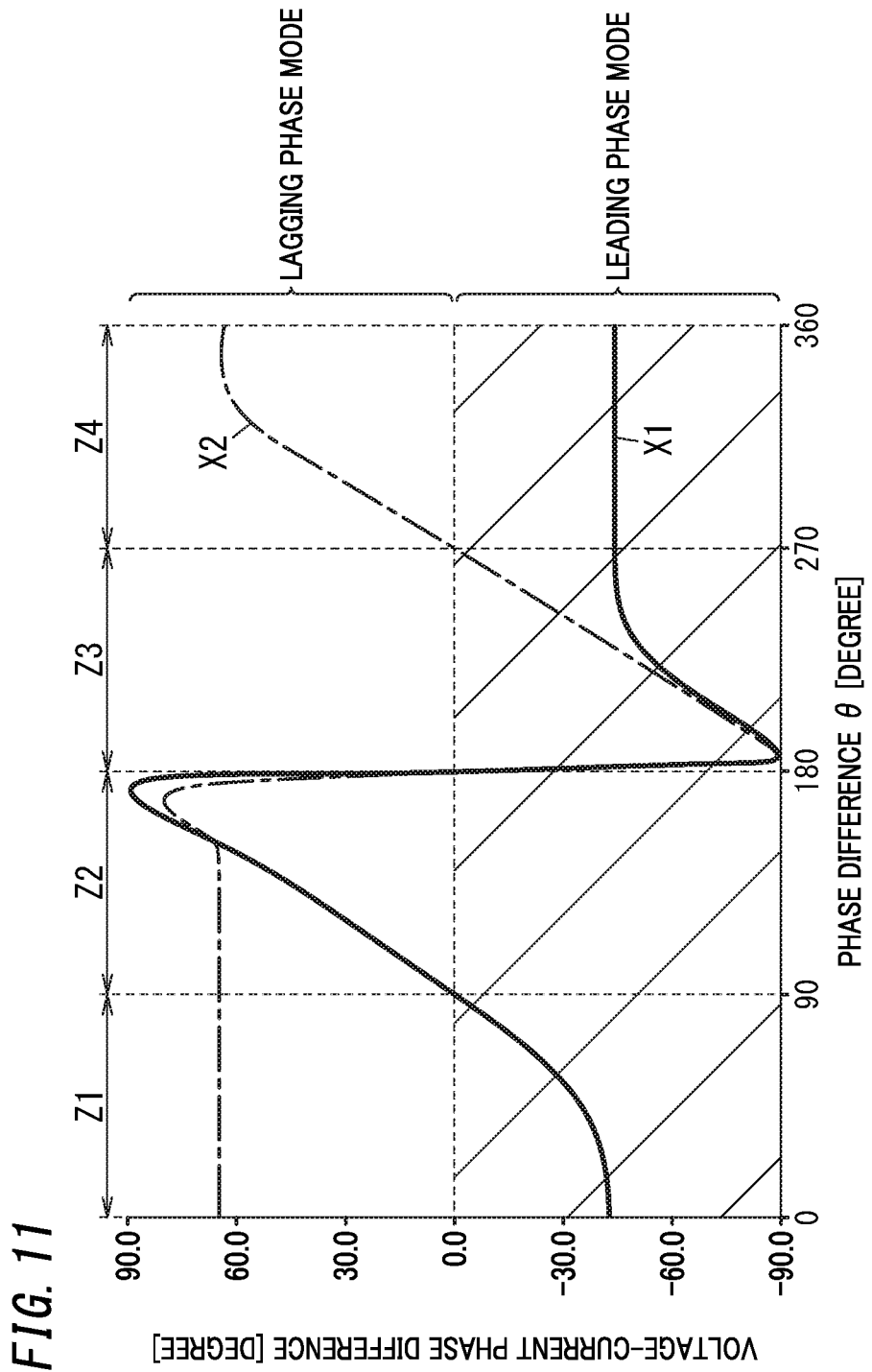
FIG. 11 is a graph illustrating the relationship between a voltage-current phase difference a phase difference in both cases of an initial leading phase and an initial lagging phase in the non-contact power supply apparatus.

With reference to FIG. 11, the principle of estimation of the initial mode from the voltage-current phase difference will be briefly described. FIG. 11 shows the relationship between the voltage-current phase difference and the phase difference θ. In FIG. 11, the abscissa represents the phase difference θ between the first drive signals G1 to G4 and the second drive signals G5 to G8, the ordinate represents the voltage-current phase difference, the voltage-current phase difference in the case of the "initial leading phase" is represented by "X1," and the voltage-current phase difference in the case of the "initial lagging phase" is represented by "X2." In FIG. 11, an area in which the voltage-current phase difference is a positive value (0 degrees to 90 degrees) is an area in which the current phase is lagging phase to the voltage phase, that is, the inverter circuit 21 operates in the lagging phase mode. In contrast, an area (hatched area) in which the voltage-current phase difference is a negative value (0 degrees to −90 degrees) is an area in which the current phase is a lagging phase with respect to the voltage phase, that is, an area in which the inverter circuit 21 operates in the lagging phase mode. In contrast, the area (hatched area) in which the voltage-current phase difference is a negative value (0 degrees to −90 degrees) is an area in which the current phase is a leading phase with respect to the voltage phase, that is, an area in which the inverter circuit 21 operates in the leading phase mode.

When the phase difference θ is in the second zone (90 degrees to 180 degrees) Z2, the inverter circuit 21 operates in the logging mode whether the initial mode is the leading phase mode or the lagging phase mode. Thus, in the second zone Z2, the voltage-current phase differences X1 and X2 are positive values in both of the cases of the "initial leading phase" and the "initial lagging phase." In contrast, when the phase difference θ is in the first zone (0 degrees to 90 degrees) Z1, the inverter circuit 21 operates in the leading phase mode in the case of the initial mode being the leading phase mode, whereas the inverter circuit 21 operates in the lagging phase mode in the case of the initial mode being the lagging phase mode. Thus, in the first zone Z1, the voltage-current phase difference X1 in the case of the "initial leading phase" is a negative value, and the voltage-current phase difference X2 in the case of the "initial lagging phase" is a positive value.

Thus, as the phase difference θ changes in the second zone Z2 and approaches the border (90 degrees) with the first zone Z1, the voltage-current phase difference X1 of the "initial leading phase" decreases, and a difference (X2−X1) from the voltage-current phase difference X2 of the "initial lagging phase" increases. In the example shown in FIG. 11, in the second zone Z2 in the vicinity (for example, 90 degrees to 100 degrees) of the border with the first zone Z1, the voltage-current phase difference X1 in the case of the "initial leading phase" decreases to the vicinity of 0 degrees, whereas the voltage-current phase difference X2 in the case of the "initial lagging phase" is greater than or equal to 60 degrees. Thus, the estimator 231 acquires the voltage-current phase difference in this case and compares the acquired voltage-current phase difference with the first threshold (e.g., 30 degrees), which enables estimation of the "initial leading phase" or the "initial lagging phase."

Note that between the case of the "initial leading phase" and the case of the "initial lagging phase," the amount of change in the voltage-current phase difference is different when the phase difference θ changes in the vicinity of the border (e.g., 90 degrees to 100 degrees) between the second zone Z2 and the first zone Z1. That is, the amount of change in the voltage-current phase difference when the phase difference θ changes within a of 90 degrees to 100 degrees is larger in the case (X1) of the "initial leading phase" than in the case (X2) of the "initial lagging phase." Thus, the estimator 231 may also estimate the initial mode on the basis of the amount of change in the voltage-current phase difference.

In a second method for estimating the initial mode, the estimator 231 estimates the initial mode on the basis of a change in the output power when the phase difference θ is changed within a range of 90 degrees to 180 degrees. That is, the estimator 231 estimates the initial mode on the basis of the change in the output current of the non-contact power supply apparatus 2.

Figure 12:
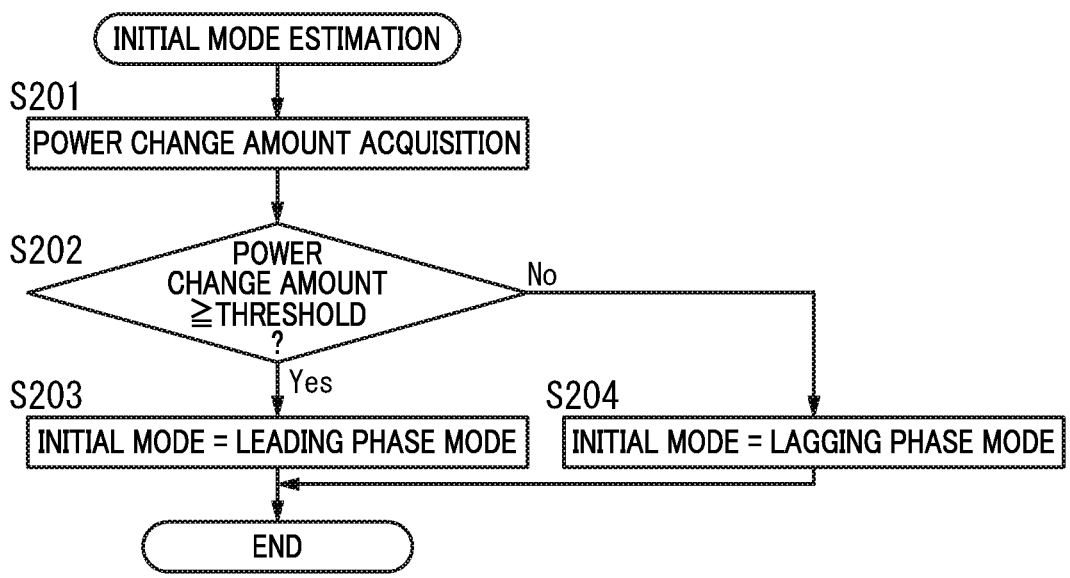
FIG. 12 is a flowchart illustrating a second method for estimating the initial mode in the non-contact power supply apparatus.

Specifically, the estimator 231 operates, for example, in accordance with the flowchart shown in FIG. 12 to estimate whether the initial mode is the leading phase mode or lagging phase mode. In the example shown in FIG. 12, when the phase difference θ is changed within the range of 90 degrees to 180 degrees, the estimator 231 acquires the amount of change in the output current (hereinafter, referred to as "power change amount") (S201). Here, the estimator 231 acquires the power change amount preferably at a timing at which the phase difference θ is in the vicinity of the lower limit value (90 degrees) of the default prescribed range. For example, when the phase difference θ is between 100 degrees to 90 degrees, the estimator 231 acquires the power change amount.

Then, the estimator 231 compares the power change amount which has been acquired with a predetermined threshold (second threshold) (S202). If the power change amount is larger than or equal to the second threshold (S202: Yes), the estimator 231 estimates that the initial mode is the leading phase mode, that is, the "initial leading phase" (S203). In contrast, if the power change amount is smaller than the second threshold (S202: No), the estimator 231 estimates that the initial mode is the lagging phase mode, that is, the "initial lagging phase" (S204).

That is, in the case of the "initial leading phase mode," the amount of change in the output power increases in the second zone Z2 in the vicinity of the border (e.g., 90 degrees to 100 degrees) with the first zone Z1 as illustrated in FIG. 5A. In contrast, in the case of the "initial lagging phase," the amount of change in the output power decreases in the second zone Z2 in the vicinity of the border (e.g., 90 degrees to 100 degrees) with the first zone Z1 as illustrated in FIG. 5B. Thus, it becomes possible to estimate whether the initial mode is the "initial leading phase" or the "initial lagging phase" by the estimator 231 on the basis of the difference of the amount of change.

<Start-Up Process>

The non-contact power supply apparatus 2 of the present embodiment causes soft-start of the inverter circuit 21 as described below at start-up in which the inverter circuit 21 and the variable capacitance circuit 22 start operating.

At the start-up of the inverter circuit 21, the control circuit 23 gradually increases the duty ratio of the first drive signals G1 to G4 for controlling the conversion switching elements Q1 to Q4 from 0 (zero) to a prescribed value (e.g., 0.5) to realize the soft-start of the inverter circuit 21. This reduces an abrupt change of a voltage and/or a current input to the non-contact power supply apparatus 2 to enable a reduction in stress applied to the circuit element. In the following description, a process of changing the duty ratio of the first drive signals G1 to G4 by the control circuit 23 as described above to realize the soft-start of the inverter circuit 21 is referred to as a "start-up process."

While the control circuit 23 performs the start-up process, the non-contact power supply apparatus 2 of the present embodiment fixes all the adjustment switching elements Q5 to Q8 of the variable capacitance circuit 22 to an on state to disable the functions of the variable capacitance circuit 22. This brings the non-contact power supply apparatus 2 into a state equivalent to the state described in "(1) Without Variable Capacitance Circuit" (see item "Basic Operation").

When the start-up process ends, that is, when the duty ratio of the first drive signals G1 to G4 reach the prescribed value (e.g., 0.5), the control circuit 23 also starts the operation of the variable capacitance circuit 22. In sum, after the start-up process ends, the control circuit 23 starts controlling the adjustment switching elements Q5 to Q8 by the second drive signals G5 to G8. This brings the non-contact power supply apparatus 2 into a state equivalent to the state described in "(2) With Variable Capacitance Circuit" (see item "Basic Operation"). Here, the prescribed range is the default range, the control circuit 23 sets the phase difference θ to 180 (degrees) which is an initial value, and the control circuit 23 causes the variable capacitance circuit 22 to start operating.

Now, when the start-up process as described above is performed, the control circuit 23 may be configured to adjust the output power by the frequency control after the start-up process ends and before the operation of the variable capacitance circuit 22 is started. That is, the control circuit 23 adjusts the output power by the frequency control after the start-up process ends and before the operation of the variable capacitance circuit 22 is started, and when the magnitude of the output power after adjustment by the frequency control is less than the prescribed target value, the control circuit 23 may cause the variable capacitance circuit 22 to start operating. In this case, after the operation of the variable capacitance circuit 22 is started, the control circuit 23 adjusts the output power by the phase difference control. With this configuration, if the magnitude of the output power reaches the target value only by the frequency control, the control circuit 23 does not cause the variable capacitance circuit 22 to operate. Thus, it is possible to avoid a reduction in the efficiency (power conversion efficiency) due to the variable capacitance circuit 22.

<Search Mode>

In the present embodiment, the control circuit 23 further has a search mode for estimating a coupling coefficient between the primary coil L1 and the secondary coil L2 in addition to the normal mode (including the start-up process) for performing the output power control as described above. In the search mode, the control circuit 23 is configured to gradually change the phase difference θ within the prescribed range and to estimate the coupling coefficient on the basis of the change of the measured value (measured value of meter 24) along with the change of the phase difference θ. The measured value here is the magnitude of a current (hereinafter also referred to as a "coil current") flowing through the primary coil L1 and is measured by the meter 24. The search mode will be described in detail below.

Figure 13A:
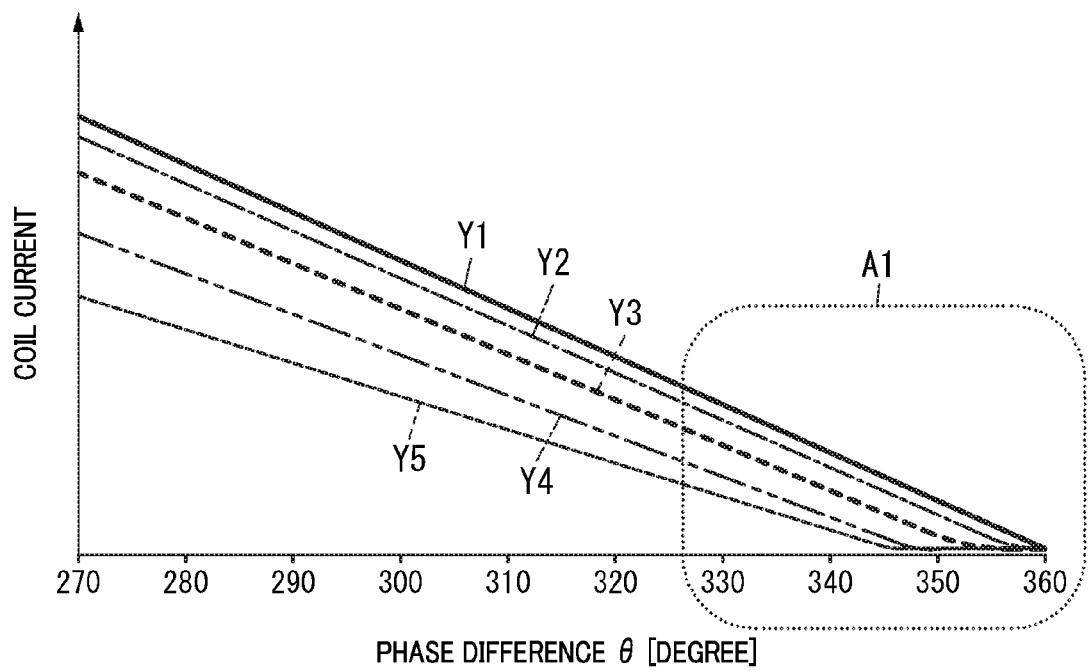
FIG. 13A is a graph illustrating an example of phase difference-coil current characteristics of the non-contact power supply apparatus.
Figure 13B:
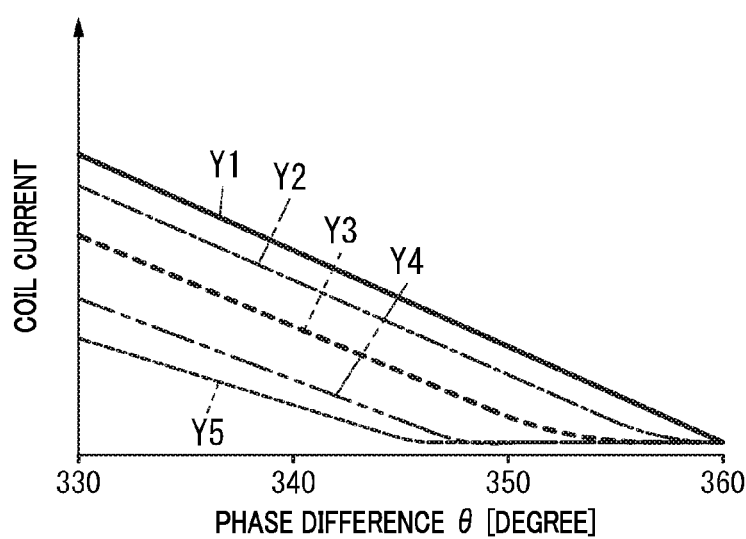
FIG. 13B is an enlarged graph of the area A1 of FIG. 13A.

As illustrated in FIGS. 13A and 13B, it is confirmed that the relationship between the coil current and the phase difference θ between each of the second drive signals G5 to G8 and each of the first drive signals G1 to G4 changes depending on the coupling coefficient between the primary coil L1 and the secondary coil L2. In FIGS. 13A and 13B, the horizontal axis represents the phase difference θ between the first drive signals G1 to G4 and the second drive signals G5 to G8, and the vertical axis represents the coil current (current flowing through the primary coil L1). In FIGS. 13A and 13B, "Y1" to "Y5" represent the relationship between the phase difference θ and the coil current in cases where coupling coefficients are different from each other. FIG. 13B is an enlarged view of the area A1 of FIG. 13A.

Here, when "Y1" to "Y5" in FIGS. 13A and 13B are arranged in the order of a larger coupling coefficient, "Y1"

to "Y5" are arranged in the order of Y5, Y4, Y3, Y2, and Y1. As can be clearly seen from FIG. 13B, when the phase difference θ is gradually reduced from the upper limit value (here 360 degrees) of the prescribed range, a phase difference θ corresponding to the inflection point at which the coil current starts increasing varies depending on the coupling coefficient. As the coupling coefficient between the primary coil L1 and the secondary coil L2 increases, the phase difference θ at which the coil current starts increasing decreases. Thus, using the relationship between the phase difference θ and the coil current as shown in FIGS. 13A and 13B enables the control circuit 23 to estimate the coupling coefficient from the change in the measured value (the magnitude of the coil current) along with the change of the phase difference θ.

Specifically, storing the relationship between the phase difference θ and the coil current as shown in FIGS. 13A and 13B as characteristic data, for example, in a table format, in a memory of a microcomputer enables the control circuit 23 to estimate the coupling coefficient by using the characteristic data. When the load is an electric vehicle, such characteristic data varies depending on types of the vehicle, and therefore, pieces of characteristic data of a plurality of types of vehicles are preferably stored. Note that the non-contact power supply apparatus 2 may communicate with the non-contact power reception apparatus 3 to obtain the characteristic data from the non-contact power reception apparatus 3.

The control circuit 23 can further estimate, from the coupling coefficient, the resonance characteristics (i.e., the relationship between the operation frequency of the inverter circuit 21 and the output power of the non-contact power supply apparatus 2) as described in item "(1) With Variable Capacitance Circuit" of "Basic Operation". As a result, the control circuit 23 can estimate a frequency range in which the inverter circuit 21 operates in the lagging phase mode (i.e., not in the leading phase mode), for example, for the operation frequency f1 of the inverter circuit 21. Thus, the control circuit 23 preferably operates in the above-described search mode before starting operation in the normal mode. In this way, the control circuit 23 can set the initial value of the operation frequency f1 in starting the operation in the normal mode to be within the frequency range in which the inverter circuit 21 operates in the lagging phase mode. Note that in this case, the lower limit value of the operation frequency f1 in the above-described frequency control is a larger one of the lower limit value of the frequency range in which the inverter circuit 21 operates in the lagging phase mode and the lower limit value fmin of the allowed frequency band F1.

Figure 14:
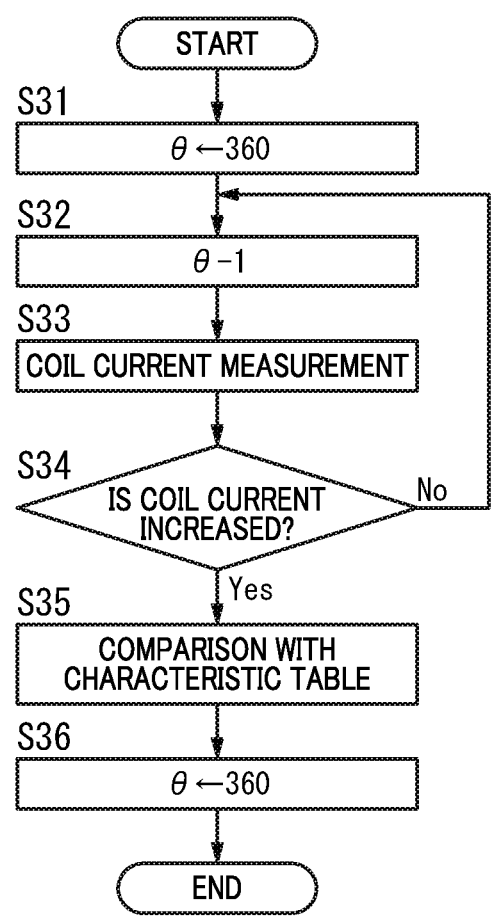
FIG. 14 is a flowchart illustrating operation of the non-contact power supply apparatus in a search mode.

With reference to the flowchart in FIG. 14 showing the process of the control circuit 23, an overall flow of the "search mode" of the present embodiment will be described below. Note that the process shown in FIG. 14 is performed before process S1 in the flowchart of FIG. 9 and before the start-up process.

When the search mode is started, the control circuit 23 first sets the phase difference θ to an initial value (here, 360 degrees) (S31). Then, the control circuit 23 decrements (θ−1) the phase difference θ (S32) to obtain a measured value of the coil current from the meter 24 (S33). Next, the control circuit 23 obtains a difference between a most recently measured value of the coil current and a previously measured value of the coil current as an increment of the coil current and compares the increment of the coil current with a threshold (S34). Here, if the increment of the coil current is less than the threshold (S34: No), the operation of the control circuit 23 returns to process S32.

If the increment of the coil current is greater than the threshold (S34: Yes), the control circuit 23 compares a current phase difference θ with a characteristic table (characteristic data in a table format) (S35). This enables the control circuit 23 to estimate the coupling coefficient and also to estimate the resonance characteristics from the coupling coefficient. Next, the control circuit 23 returns the phase difference θ to the initial value (here, 360 degrees) (S36) and terminates the search mode.

<Effects>

As described above, the non-contact power supply apparatus 2 of the present embodiment provides the advantage that even when the relative positional relationship between the primary coil L1 and the secondary coil L2 changes, required electric power is easily secured. That is, the non-contact power supply apparatus 2 adjusts the phase difference θ, which is a delay of the phase of each of the second drive signals G6 and G7 (G5, G8) to the phase of each of the first drive signals G1 and G4 (G2, G3), to a set value within a prescribed range, thereby enabling adjustment of the magnitude of the output power. Thus, even when a change in the relative positional relationship between the primary coil L1 and the secondary coil L2 changes the coupling coefficient between the primary coil L1 and the secondary coil L2, adjusting the phase difference θ enables the non-contact power supply apparatus 2 to easily secure required electric power. Moreover, since adjusting the phase difference θ adjusts the output power, the non-contact power supply apparatus 2 is particularly useful, for example, when the frequency band (allowed frequency band F1) usable as the operation frequency f1 of the inverter circuit 21 is limited.

Moreover, since the phase difference θ is adjusted to the set value within the prescribed range, the inverter circuit 21 is operable in a lagging phase mode when the prescribed range satisfies prescribed conditions. The prescribed conditions under which the inverter circuit 21 operates in the lagging phase mode are not invariable but vary depending on the initial mode (operation mode of the inverter circuit 21 in the case where the variable capacitance circuit 22 is disabled). Thus, in the present embodiment, the control circuit 23 estimates whether the initial mode is the leading phase mode or the lagging phase mode by the estimator 231 while the variable capacitance circuit 22 is operating, and the control circuit 23 sets the prescribed range by the setter 232 on the basis of the initial mode which has been estimated. Thus, the non-contact power supply apparatus 2 of the present embodiment can set the prescribed range to an appropriate range according to the initial mode to operate the inverter circuit 21 in the lagging phase mode. Under the prescribed conditions, the prescribed range in the case of the "initial lagging phase" may be either the range of 90 degrees to 180 degrees or the range of 270 degrees to 360 degrees. The prescribed range in the case of the "initial leading phase" is limited to only the range of 90 degrees to 180 degrees.

Moreover, as in the present embodiment, when the initial mode estimated by the estimator 231 is the leading phase mode, the setter 232 preferably sets the prescribed range to the range of 90 degrees to 180 degrees. In this case, when the initial mode estimated by the estimator 231 is the lagging phase mode, the setter 232 sets the prescribed range to a range including both the range of 90 degrees to 180 degrees and the range of 270 degrees to 360 degrees. With this configuration, both in the case of the "initial lagging phase"

and in the case of the "initial leading phase," the inverter circuit 21 is operable in the lagging phase mode when the control circuit 23 adjusts the phase difference θ to the set value within the prescribed range to adjust the magnitude of the output current of the non-contact power supply apparatus 2.

Moreover, as in the present embodiment, when the initial mode estimated by the estimator 231 is the lagging phase mode, the control circuit 23 can preferably alternatively select a first process or a second process. The first process is a process of adjusting the phase difference θ within a range of 90 degrees to 180 degrees. The second process is a process of adjusting the phase difference θ within a range of 270 degrees to 360 degrees. In this case, the control circuit 23 is configured to transition to the second process when the magnitude of the output power after the first process is less than a prescribed target value. The control circuit 23 is preferably configured to gradually reduce the phase difference θ from 90 degrees toward 0 degrees when transitioning from the first process to the second process. This configuration enables the control circuit 23 to continuously change the phase difference θ from 90 degrees to 0 degrees (=360 degrees) when transitioning from the first process to the second process. Moreover, also while the phase difference θ is within the range of 0 degrees to 90 degrees, the inverter circuit 21 can operate in the lagging phase mode.

Moreover, as in the present embodiment, the estimator 231 is preferably configured to estimate the initial mode on the basis of the voltage-current phase difference which is a difference between the voltage phase and the current phase of the inverter circuit 21. This configuration enables the estimator 231 to estimate the initial mode (the operation mode of the inverter circuit 21 in the case of the variable capacitance circuit 22 being disabled) by a relatively simple computation process without actually disabling the operation of the variable capacitance circuit 22.

Alternatively, the estimator 231 may be configured to estimate the initial mode on the basis of a change in the output power when the phase difference θ is changed within a range of 90 degrees to 180 degrees. This configuration enables the estimator 231 to estimate the initial mode (the operation mode of the inverter circuit 21 in the case of the variable capacitance circuit 22 being disabled) by a relatively simple computation process without actually disabling the operation of the variable capacitance circuit 22.

Moreover, when the control circuit 23 includes a microcomputer as a main component, a program stored in a memory of the microcomputer is a program which causes a computer (microcomputer) to function as a controller 233, the estimator 231, the setter 232 wherein the computer is used in the non-contact power supply apparatus 2. The non-contact power supply apparatus 2 here includes the inverter circuit 21, the primary coil L1, and the variable capacitance circuit 22. The controller 233 is configured to control the plurality of conversion switching elements Q1 to Q4 by the first drive signals G1 to G4 and to control the plurality of adjustment switching elements Q5 to Q8 by the second drive signals G5 to G8. The controller 233 is configured to adjust the phase difference θ to a set value within a prescribed range to adjust the magnitude of the output power. The estimator 231 estimates whether the initial mode which is the operation mode of the inverter circuit 21 in the case of the variable capacitance circuit 22 being disabled is the leading phase mode or the lagging phase mode while the variable capacitance circuit 22 is operating. The setter 232 sets the prescribed range in accordance with the initial mode estimated by the estimator 231.

This program provides advantages that functions equivalent to those of the non-contact power supply apparatus 2 of the present embodiment can be realized even without a dedicated control circuit 23 and that even when the relative positional relationship between the primary coil L1 and the secondary coil L2 changes, required electric power is easily secured.

Moreover, controlling the non-contact power supply apparatus 2 including the inverter circuit 21, the primary coil L1, and the variable capacitance circuit 22 by the following control method enables realization of functions equivalent to those of the non-contact power supply apparatus 2 of the present embodiment even without the dedicated control circuit 23.

That is, the method for controlling the non-contact power supply apparatus 2 is a method which includes controlling the plurality of conversion switching elements Q1 to Q4 by the first drive signals G1 to G4 and controlling the plurality of adjustment switching elements Q5 to Q8 by the second drive signals G5 to G8. This method includes an estimation step and a setting step in addition to a control step of adjusting the phase difference θ to a set value within a prescribed range to adjust the magnitude of the output power. The estimation step is a step of estimating whether the initial mode which is the operation mode of the inverter circuit 21 in the case of the variable capacitance circuit 22 being disabled is the leading phase mode or the lagging phase mode while the variable capacitance circuit 22 is operating. The setting step is a step of setting the prescribed range in accordance with the initial mode estimated in the estimation step.

The method for controlling the non-contact power supply apparatus 2 provides advantages that functions equivalent to those of the non-contact power supply apparatus 2 of the present embodiment can be realized even without the dedicated control circuit 23 and that even when the relative positional relationship between the primary coil L1 and the secondary coil L2 changes, required electric power is easily secured.

<As to Primary Coil, Secondary Coil>

Here, the primary coil L1 and the secondary coil L2 of the present embodiment may be solenoid coils each obtained by helically winding a conductor wire onto a core but is preferably spiral coils each obtained by spirally winding a conductor wire on a flat pane. The spiral coil has the advantage that unnecessary interference noise is less likely to occur as compared to the solenoid coil. Moreover, using the spiral coil reduces the unnecessary interference noise and consequently provides the advantage of an expanded operation frequency range available to the inverter circuit 21. This point will be described in detail below.

Figure 15:
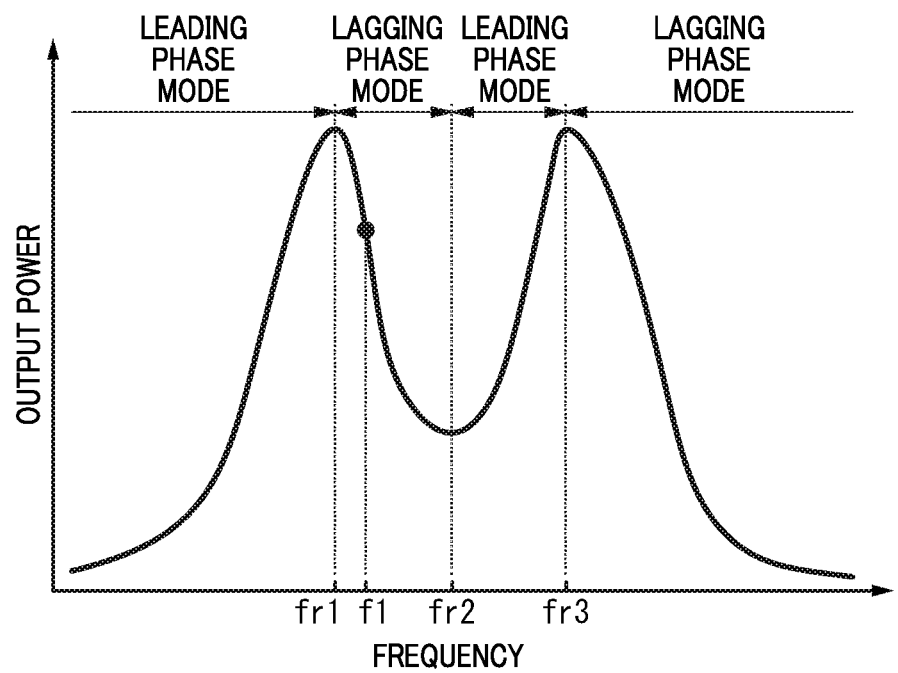
FIG. 15 is a graph illustrating an example of resonance characteristics of the non-contact power supply apparatus.

That is, the resonance characteristics of the non-contact power transmission system 1, as described above, changes depending on the coupling coefficient of the primary coil L1 and the secondary coil L2, and under a certain condition, as illustrated in FIG. 15, the resonance characteristics show so-called double-crest characteristics having two local maximum values of an output. As illustrated in FIG. 15, in the resonance characteristics (double-crest characteristics), two "crests" occur at which the output is local maximum with a first frequency fr1 and a third frequency fr3. Between these two "crests," a "trough" is formed at which the output is local minimum with a second frequency fr2. Here, the first frequency fr1, the second frequency fr2, and the third frequency fr3 are in a relationship expressed as fr1<fr2<fr3. In the following description, with reference to the second frequency fr2, a frequency range lower than the second frequency fr2 is referred to as a "low-frequency range," and a frequency range higher than the second frequency fr2 is referred to as a "high-frequency range."

In such resonance characteristics, each of the "crest" (crest which is local maximum at the first frequency fr1) of the low-frequency range and the "crest" (crest which is local maximum at the third frequency fr3) of the high-frequency range has a region (hereinafter referred to as a "lagging region") in which the inverter circuit 21 operates in the lagging phase mode. Thus, the inverter circuit 21 is operable in the lagging phase mode when the operation frequency f1 is assigned to either of the two "crests."

Here, the case where the operation frequency f1 of the inverter circuit 21 is assigned to the "crest" of the low-frequency range is compared with the case where the operation frequency f1 of the inverter circuit 21 is assigned to the "crest" of the high-frequency range. The unnecessary interference noise in the case where the operation frequency f1 is assigned to the "crest" of the low-frequency range is smaller than that in the case where the operation frequency f1 is assigned to the "crest" of the high-frequency range. That is, at the "crest" of the high-frequency range, a current flowing through the primary coil L1 and a current flowing through the secondary coil L2 are in the same phase. In contrast, at the "crest" of the low-frequency range, the current flowing through the primary coil L1 and the current flowing through the secondary coil L2 are in an ant-phase. Thus, at the "crest" of the low-frequency range, the unnecessary interference noise generated at the primary coil L1 and the unnecessary interference noise generated at the secondary coil L2 cancel out each other, and therefore, the unnecessary interference noise is reduced in the entire non-contact power transmission system 1.

Thus, even when the solenoid coil is adopted, if the operation frequency f1 of the inverter circuit 21 is within a lagging region (from the first frequency fr1 to the second frequency fr2) of the "crest" of the low-frequency range, the inverter circuit 21 operates in the lagging phase mode, and the unnecessary interference noise is also reduced. However, the lagging region of the "crest" of the low-frequency range changes depending on the coupling coefficient of the primary coil L1 and the secondary coil L2, and therefore, control for setting the operation frequency f1 of the inverter circuit 21 within such an indeterminate lagging region is required.

In contrast, in the case of the spiral coil, even when the operation frequency f1 of the inverter circuit 21 is within a lagging region (frequencies higher than the third frequency fr3) of the "crest" of the high-frequency range, the unnecessary interference noise is significantly reduced as compared to the solenoid coil. That is, the use of the spiral coil does not limit the operation frequency f1 of the inverter circuit 21 to the lagging region of the "crest" of the low-frequency range but expands the range of the operation frequency f1 available to the inverter circuit 21. Note that the lagging region of the "crest" of the high-frequency range is also an indeterminate region, but when the operation frequency f1 of the inverter circuit 21 is swept from a sufficiently high frequency toward a low frequency, the operation frequency f1 passes through the lagging region of the "crest" of the high-frequency range, and therefore, no complicated control is required.

<Variation>

Figure 16:
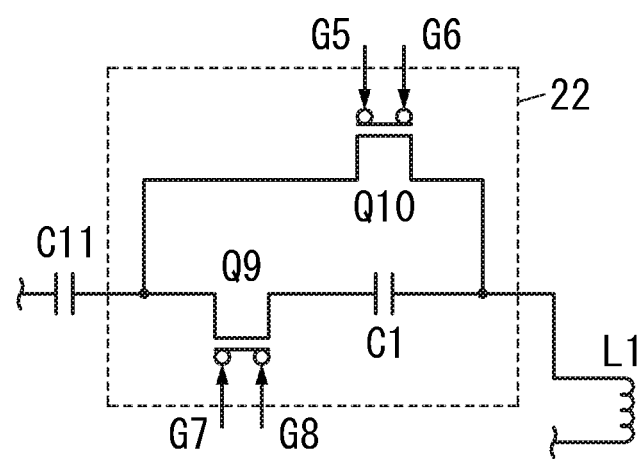
FIG. 16 is a circuit diagram illustrating the configuration of a variable capacitance circuit according to a variation according to the embodiment of the present invention.

The variable capacitance circuit 22 is not limited to the configuration using the four adjustment switching elements Q5 to Q8 as described in the present embodiment. The variable capacitance circuit 22 may have a configuration including two adjustment switching elements Q9 and Q10 as illustrated in FIG. 16. In a variable capacitance circuit 22 shown in FIG. 16, each of the adjustment switching elements Q9 and Q10 is a semiconductor switching element having a double-gate structure including two gates. Moreover, the first adjustment switching element Q9 is electrically connected in series to an adjustment capacitor C1. The second adjustment switching element Q10 is electrically connected in parallel to a series circuit of the adjustment switching element Q9 and the adjustment capacitor C1. The two gates of the adjustment switching element Q9 receive respective second drive signals G7 and G8. Moreover, the two gates of the adjustment switching element Q10 receive respective second drive signals G5 and G6. In the variable capacitance circuit 22 shown in FIG. 16, the two adjustment switching elements Q9 and Q10 are controlled by the second drive signals G5 to G8, and the variable capacitance circuit 22 shown in FIG. 16 functions equivalently to the variable capacitance circuit 22 shown in FIG. 1.

Moreover, a load to which output power is supplied (i.e., charged) from the non-contact power supply apparatus 2 in a non-contact manner is not limited to an electric vehicle, but may be an electrical device including a storage battery such as mobile phones and smartphones or an electrical device including no storage battery such as lighting fixtures.

Moreover, a method for transmitting output power from the non-contact power supply apparatus 2 to the non-contact power reception apparatus 3 is not limited to the above-described magnetic field resonance method but may be an electromagnetic induction method, a microwave transmission method, or the like.

Moreover, each of the conversion switching elements Q1 to Q4 and each of the adjustment switching elements Q5 to Q8 may include other semiconductor switching elements such as bipolar transistors, Insulated Gate Bipolar Transistors (IGBTs), and the like.

Moreover, each of the diodes D1 to D4 is not limited the parasitic diode of each of the conversion switching elements Q1 to Q4 but may be externally provided to each of the conversion switching elements Q1 to Q4. Similarly, each of the diodes D5 to D8 is not limited to the parasitic diode of each of the adjustment switching elements Q5 to Q8 but may be externally provided to each of the adjustment switching elements Q5 to Q8.

Moreover, the configuration of the meter 24 is not limited to the configuration that the meter 24 is provided separately from the control circuit 23. The meter 24 may be provided integrally with the control circuit 23. Moreover, since it is required only that the meter 24 can measure the magnitude of the current flowing through the primary coil L1, the location of the current sensor 25 is not limited between the primary coil L1 and the second primary capacitor C12 but the current sensor 25 may be disposed on a path through which a current flowing to the primary coil L1 flows.

Moreover, it is not essential for the controller 233 of the control circuit 23 to perform frequency control, but the controller 233 may be configured to adjust the magnitude of the output power by only the phase difference control.

Moreover, it is not essential for one control circuit 23 to be provided with the estimator 231, the setter 232, and the controller 233. For example, at least one of the estimator 231 and the setter 232 may be disposed separately from the controller 233.

Moreover, it is not essential for the controller 233 to continuously perform phase difference control within the prescribed range set in accordance with the initial mode after performing the phase difference control within a default prescribed range (a range of 90 degrees to 180 degrees). For example, in the case of the "initial lagging phase," the controller 233 performs the phase difference control within the default prescribed range (range of 90 degrees to 180 degrees), and then, the controller 233 may perform the frequency control. In this case, if the magnitude of the output power after adjustment by the frequency control is less than a prescribed target value, the controller 233 then performs the phase difference control within the prescribed range (range of 270 degrees to 360 degrees) set (expanded) in accordance with the initial mode.

Moreover, the inverter circuit 21 may be a voltage inverter configured to convert a direct-current voltage into an alternating-current voltage and to be able to output the alternating-current voltage, and the inverter circuit 21 is not limited to the full-bridge inverter circuit including full-bridge connection of the four conversion switching elements Q1 to Q4. The inverter circuit 21 may be, for example, a half-bridge inverter circuit.

REFERENCE SIGNS LIST

1 Non-Contact Power Supply System
2 Non-Contact Power Supply Apparatus
3 Non-Contact Power Reception Apparatus
21 Inverter Circuit
211, 212 Pair of Input Points
213, 214 Pair of Output Points
22 Variable Capacitance Circuit
23 Control Circuit (Controller)
231 Estimator
232 Setter
233 Controller
C1 Adjustment Capacitor
G1 to G4 First Drive Signal
G5 to G8 Second Drive Signal
L1 Primary Coil
L2 Secondary Coil
Q1 to Q4 Conversion Switching Element
Q5 to Q8 Adjustment Switching Element
Q9, Q10 Adjustment Switching Element
θ Phase Difference

The invention claimed is:

1. A non-contact power supply apparatus, comprising:
an inverter circuit which includes a plurality of conversion switching elements electrically connected between a pair of input points and a pair of output points and which is configured to convert a direct-current voltage applied to the pair of input points into an alternating-current voltage by switching the plurality of conversion switching elements and to output the alternating-current voltage from the pair of output points;
a primary coil electrically connected between the output points in the pair and configured to supply output power to a secondary coil in a non-contact manner when the alternating-current voltage is applied to the primary coil;
a variable capacitance circuit electrically connected between the pair of output points and the primary coil, including an adjustment capacitor and a plurality of adjustment switching elements, and configured to adjust a magnitude of a capacity component between the pair of output points and the primary coil by switching the plurality of adjustment switching elements; and
a control circuit configured to control the plurality of conversion switching elements by a first drive signal and to control the plurality of adjustment switching elements by a second drive signal, wherein
the control circuit is configured to adjust a phase difference which is a delay of a phase of the second drive signal to a phase of the first drive signal to a set value within a prescribed range to adjust a magnitude of the output power, and
the control circuit includes
an estimator configured to, while the variable capacitance circuit is in operation, estimate whether an initial mode which is an operation mode of the inverter circuit in a case of the variable capacitance circuit being disabled is a leading phase mode or a lagging phase mode, and
a setter configured to set the prescribed range in accordance with the initial mode estimated by the estimator.

2. The non-contact power supply apparatus according to claim 1, wherein
the setter is configured to set the prescribed range to a range of 90 degrees to 180 degrees when the initial mode estimated by the estimator is the leading phase mode and to set the prescribed range to a range including both the range of 90 degrees to 180 degrees and a range of 270 degrees to 360 degrees when the initial mode estimated by the estimator is the lagging phase mode.

3. The non-contact power supply apparatus according to claim 2, wherein
the control circuit is configured, when the initial mode estimated by the estimator is the lagging phase mode, to be capable of alternatively selecting a first process of adjusting the phase difference within the range of 90 degrees to 180 degrees or a second process of adjusting the phase difference within the range of 270 degrees to 360 degrees, and to transition to the second process when the magnitude of the output power after the first process is less than a prescribed target value, and
to gradually reduces the phase difference from 90 degrees toward 0 degrees when transitioning from the first process to the second process.

4. The non-contact power supply apparatus according to claim 1, wherein
the estimator is configured to estimate the initial mode based on a voltage-current phase difference which is a difference between a voltage phase and a current phase of the inverter circuit.

5. The non-contact power supply apparatus according to claim 1, wherein
the estimator is configured to estimate the initial mode based on a change in the output power when the phase difference is changed within a range of 90 degrees to 180 degrees.

6. A non-transitory computer-readable recording medium recording a program which causes a computer to function as a controller, an estimator, and a setter, wherein
the computer is used in a non-contact power supply apparatus including:
an inverter circuit which includes a plurality of conversion switching elements electrically connected between a pair of input points and a pair of output points and which is configured to convert a direct-current voltage applied to the pair of input points into an alternating-current voltage by switching the plurality of conversion switching elements and to output the alternating-current voltage from the pair of output points;
a primary coil electrically connected between the output points in the pair and configured to supply output power to a secondary coil in a non-contact manner when the alternating-current voltage is applied to the primary coil; and
a variable capacitance circuit electrically connected between the pair of output points and the primary coil, including an adjustment capacitor and a plurality of adjustment switching elements, and configured to adjust a magnitude of a capacity component between the pair of output points and the primary coil by switching the plurality of adjustment switching elements,
the controller is configured to control the plurality of conversion switching elements by a first drive signal, to control the plurality of adjustment switching elements by a second drive signal, to adjust a phase difference which is a delay of a phase of the second drive signal to a phase of the first drive signal to a set value within a prescribed range to adjust a magnitude of the output power,
the estimator is configured to, while the variable capacitance circuit is in operation, estimate whether an initial mode which is an operation mode of the inverter circuit in a case of the variable capacitance circuit being disabled is a leading phase mode or a lagging phase mode, and
the setter is configured to set the prescribed range in accordance with the initial mode estimated by the estimator.

7. A method for controlling a non-contact power supply apparatus including:
an inverter circuit which includes a plurality of conversion switching elements electrically connected between a pair of input points and a pair of output points and which is configured to convert a direct-current voltage applied to the pair of input points into an alternating-current voltage by switching the plurality of conversion switching elements and to output the alternating-current voltage from the pair of output points;
a primary coil electrically connected between the output points in the pair and configured to supply output power to a secondary coil in a non-contact manner when the alternating-current voltage is applied to the primary coil; and
a variable capacitance circuit electrically connected between the pair of output points and the primary coil, including an adjustment capacitor and a plurality of adjustment switching elements, and configured to adjust a magnitude of a capacity component between the pair of output points and the primary coil by switching the plurality of adjustment switching elements,
the method comprising:
a control step of
controlling the plurality of conversion switching elements by a first drive signal,
controlling the plurality of adjustment switching elements by a second drive signal, and
adjusting a phase difference which is a delay of a phase of the second drive signal to a phase of the first drive signal to a set value within a prescribed range to adjust a magnitude of the output power;
an estimation step of, while the variable capacitance circuit is in operation, estimating whether an initial mode which is an operation mode of the inverter circuit in a case of the variable capacitance circuit being disabled is a leading phase mode or a lagging phase mode, and
a setting step of setting the prescribed range in accordance with the initial mode estimated in the estimation step.

8. A non-contact power transmission system, comprising:
the non-contact power supply apparatus according to claim 1; and
a non-contact power reception apparatus including the secondary coil, wherein
the non-contact power reception apparatus is configured to be supplied with the output power from the non-contact power supply apparatus in a non-contact manner.

9. The non-contact power supply apparatus according to claim 2, wherein
the estimator is configured to estimate the initial mode based on a voltage-current phase difference which is a difference between a voltage phase and a current phase of the inverter circuit.

10. The non-contact power supply apparatus according to claim 3, wherein
the estimator is configured to estimate the initial mode based on a voltage-current phase difference which is a difference between a voltage phase and a current phase of the inverter circuit.

11. The non-contact power supply apparatus according to claim 2, wherein
the estimator is configured to estimate the initial mode based on a change in the output power when the phase difference is changed within a range of 90 degrees to 180 degrees.

12. The non-contact power supply apparatus according to claim 3, wherein
the estimator is configured to estimate the initial mode based on a change in the output power when the phase difference is changed within a range of 90 degrees to 180 degrees.

13. The non-contact power supply apparatus according to claim 1, wherein
the control circuit is configured to gradually change the phase difference within the prescribed range to gradually change the magnitude of the output power, and stop changing the phase difference when the magnitude of the output power reaches a target value.

14. The non-contact power supply apparatus according to claim 1, wherein
the control circuit is configured to cause the inverter circuit to operate in the lagging phase mode.

* * * * *